US010767071B2

United States Patent
Osaka et al.

(10) Patent No.: US 10,767,071 B2
(45) Date of Patent: Sep. 8, 2020

(54) LIQUID MATERIAL FOR FORMING THREE-DIMENSIONAL OBJECT AND MATERIAL SET FOR FORMING THREE-DIMENSIONAL OBJECT, THREE-DIMENSIONAL OBJECT PRODUCING METHOD AND THREE-DIMENSIONAL OBJECT PRODUCING APPARATUS

(71) Applicants: Keiko Osaka, Kanagawa (JP); Takeo Yamaguchi, Kanagawa (JP)

(72) Inventors: Keiko Osaka, Kanagawa (JP); Takeo Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 956 days.

(21) Appl. No.: 15/041,761

(22) Filed: Feb. 11, 2016

(65) Prior Publication Data

US 2016/0272844 A1 Sep. 22, 2016

(30) Foreign Application Priority Data

Mar. 19, 2015 (JP) ................................. 2015-055639

(51) Int. Cl.
*C09D 139/06* (2006.01)
*C09D 129/04* (2006.01)
(Continued)

(52) U.S. Cl.
CPC .......... *C09D 139/06* (2013.01); *B22F 1/0062* (2013.01); *B22F 3/003* (2013.01);
(Continued)

(58) Field of Classification Search
CPC ...... B29C 64/00; B29C 64/165; C09D 139/06
See application file for complete search history.

(56) References Cited

U.S. PATENT DOCUMENTS

| 8,668,852 B2 * | 3/2014 | Ookubo | C08J 3/122 |
| | | | 264/113 |
| 2002/0016387 A1 * | 2/2002 | Shen | B33Y 70/00 |
| | | | 523/201 |

(Continued)

FOREIGN PATENT DOCUMENTS

| EP | 1 524 098 A1 | 4/2005 |
| JP | 2004-330743 | 11/2004 |

(Continued)

OTHER PUBLICATIONS

U.S. Appl. No. 14/816,370, filed Aug. 3, 2015.
Extended European Search Report dated Jul. 19, 2016 in Patent Application No. 16159025.2.

*Primary Examiner* — Colleen P Dunn
*Assistant Examiner* — Jeremy C Jones
(74) *Attorney, Agent, or Firm* — Oblon, McClelland, Maier & Neustadt, L.L.P.

(57) ABSTRACT

Provided is a liquid material for forming a three-dimensional object used for forming a three-dimensional object made of a powder material for forming a three-dimensional object containing an organic material and a base material, wherein the liquid material contains a cross-linking agent cross-linkable with the organic material and a water-soluble resin having a weight average molecular weight of greater than or equal to 50,000.

15 Claims, 2 Drawing Sheets

(51) Int. Cl.

| | |
|---|---|
| *B22F 3/10* | (2006.01) |
| *C09D 171/02* | (2006.01) |
| *C08K 5/17* | (2006.01) |
| *B33Y 70/00* | (2020.01) |
| *C08L 71/02* | (2006.01) |
| *C09J 171/02* | (2006.01) |
| *C09J 139/06* | (2006.01) |
| *B22F 1/00* | (2006.01) |
| *B22F 3/00* | (2006.01) |
| *C08L 39/06* | (2006.01) |
| *C04B 35/64* | (2006.01) |
| *C08K 3/08* | (2006.01) |
| *B29C 64/165* | (2017.01) |
| *C08L 29/04* | (2006.01) |
| *B29C 64/00* | (2017.01) |
| *C04B 35/486* | (2006.01) |
| *C08K 5/053* | (2006.01) |
| *C08K 5/51* | (2006.01) |
| *C08K 5/5317* | (2006.01) |
| *B33Y 10/00* | (2015.01) |
| *B33Y 30/00* | (2015.01) |

(52) U.S. Cl.
CPC .............. *B22F 3/008* (2013.01); *B29C 64/00* (2017.08); *B29C 64/165* (2017.08); *B33Y 70/00* (2014.12); *C04B 35/486* (2013.01); *C04B 35/64* (2013.01); *C08K 3/08* (2013.01); *C08K 5/053* (2013.01); *C08K 5/17* (2013.01); *C08K 5/51* (2013.01); *C08L 29/04* (2013.01); *C08L 39/06* (2013.01); *C08L 71/02* (2013.01); *C09D 129/04* (2013.01); *C09D 171/02* (2013.01); *C09J 139/06* (2013.01); *C09J 171/02* (2013.01); *B22F 2998/10* (2013.01); *B33Y 10/00* (2014.12); *B33Y 30/00* (2014.12); *C08K 5/175* (2013.01); *C08K 5/5317* (2013.01); *C08L 2312/00* (2013.01)

(56) References Cited

U.S. PATENT DOCUMENTS

| | | | |
|---|---|---|---|
| 2002/0156218 A1* | 10/2002 | Nakata | B41M 5/5254 526/303.1 |
| 2005/0003189 A1* | 1/2005 | Bredt | C08L 101/00 428/402 |
| 2005/0070671 A1* | 3/2005 | Torii | A61L 15/60 525/329.7 |
| 2005/0082710 A1 | 4/2005 | Oriakhi et al. | |
| 2011/0058006 A1* | 3/2011 | Kobayashi | B41M 5/5227 347/106 |
| 2011/0059247 A1* | 3/2011 | Kuzusako | B22C 9/00 427/372.2 |
| 2015/0158249 A1* | 6/2015 | Goto | B29C 64/188 264/40.1 |
| 2015/0258723 A1* | 9/2015 | Hirata | B33Y 70/00 425/404 |

FOREIGN PATENT DOCUMENTS

| | | | |
|---|---|---|---|
| JP | 2005-212358 A | | 8/2005 |
| JP | 2005212358 A | * | 8/2005 |
| JP | 2005-297325 | | 10/2005 |
| JP | 2009-275097 | | 11/2009 |
| WO | WO2015/046629 A1 | | 4/2015 |

* cited by examiner

LIQUID MATERIAL FOR FORMING THREE-DIMENSIONAL OBJECT AND MATERIAL SET FOR FORMING THREE-DIMENSIONAL OBJECT, THREE-DIMENSIONAL OBJECT PRODUCING METHOD AND THREE-DIMENSIONAL OBJECT PRODUCING APPARATUS

CROSS-REFERENCE TO RELATED APPLICATIONS

The present application claims priority under 35 U.S.C. § 119 to Japanese Patent Application No. 2015-055639, filed Mar. 19, 2015. The contents of which are incorporated herein by reference in their entirety.

BACKGROUND OF THE INVENTION

Field of the Invention

The present disclosure relates to liquid materials for forming three-dimensional objects and material sets for forming three-dimensional objects, and three-dimensional object producing methods and three-dimensional object producing apparatuses.

Description of the Related Art

In recent years, there have been increasing needs for small-lot production of complicated, fine three-dimensional objects. As the techniques for meeting the needs, powder adhering methods, etc. have been proposed.

As examples of the powder adhering methods, there have been proposed a method for delivering an adhesive material to a powder thin layer according to an inkjet method, a method for laminating layers of a powder material, which is a mixture of powder particles and adhesive particles, and delivering a binding agent to the laminated layers to dissolve and solidify the adhesive particles and produce a three-dimensional object (see Japanese Unexamined Patent Application Publication No. 2004-330743), and a method for dissolving a coating resin of a powder material, which is obtained by coating a base material such as glass and ceramic with a hydrophobic resin, by a solvent such as limonene and toluene to solidify the powder material and produce a three-dimensional object (see Japanese Unexamined Patent Application Publication No. 2005-297325).

However, the technique described in Japanese Unexamined Patent Application Publication No. 2004-330743 cannot impart a sufficient strength and precision to a three-dimensional object because it is not easy for an adhesive liquid, which is obtained by delivering the binding material and dissolving the adhesive particles, to spread uniformly between the powder particles. Furthermore, this technique has problems that nozzle heads used when delivering the adhesive material according to an inkjet method may be clogged, that selection of adhesive materials that can be used is limited, and that efficiency is spoiled by a cost needed.

The technique described in Japanese Unexamined Patent Application Publication No. 2005-297325 has a risk that lowly-volatile limonene tends to remain in a three-dimensional object and reduce the strength of the three-dimensional object. Furthermore, lowly-volatile solvents such as toluene are problematic in safety.

SUMMARY OF THE INVENTION

The present invention has an object to provide a liquid material for forming a three-dimensional object having an excellent storage stability and capable of producing a three-dimensional object having a complicated shape with a good dimensional precision and with a sufficient strength that would not let the three-dimensional object undergo a shape collapse before sintering, etc.

A liquid material for forming a three-dimensional object of the present invention as means of realizing the object described above is a liquid material for forming a three-dimensional object used for forming a three-dimensional object made of a powder material for forming a three-dimensional object containing an organic material and a base material. The liquid material for forming a three-dimensional object contains a cross-linking agent cross-linkable with the organic material and a water-soluble resin having a weight average molecular weight of greater than or equal to 50,000.

The present invention can provide a liquid material for forming a three-dimensional object having an excellent storage stability and capable of producing a three-dimensional object having a complicated shape with a good dimensional precision and with a sufficient strength that would not let the three-dimensional object undergo a shape collapse before sintering, etc.

Figure 1:
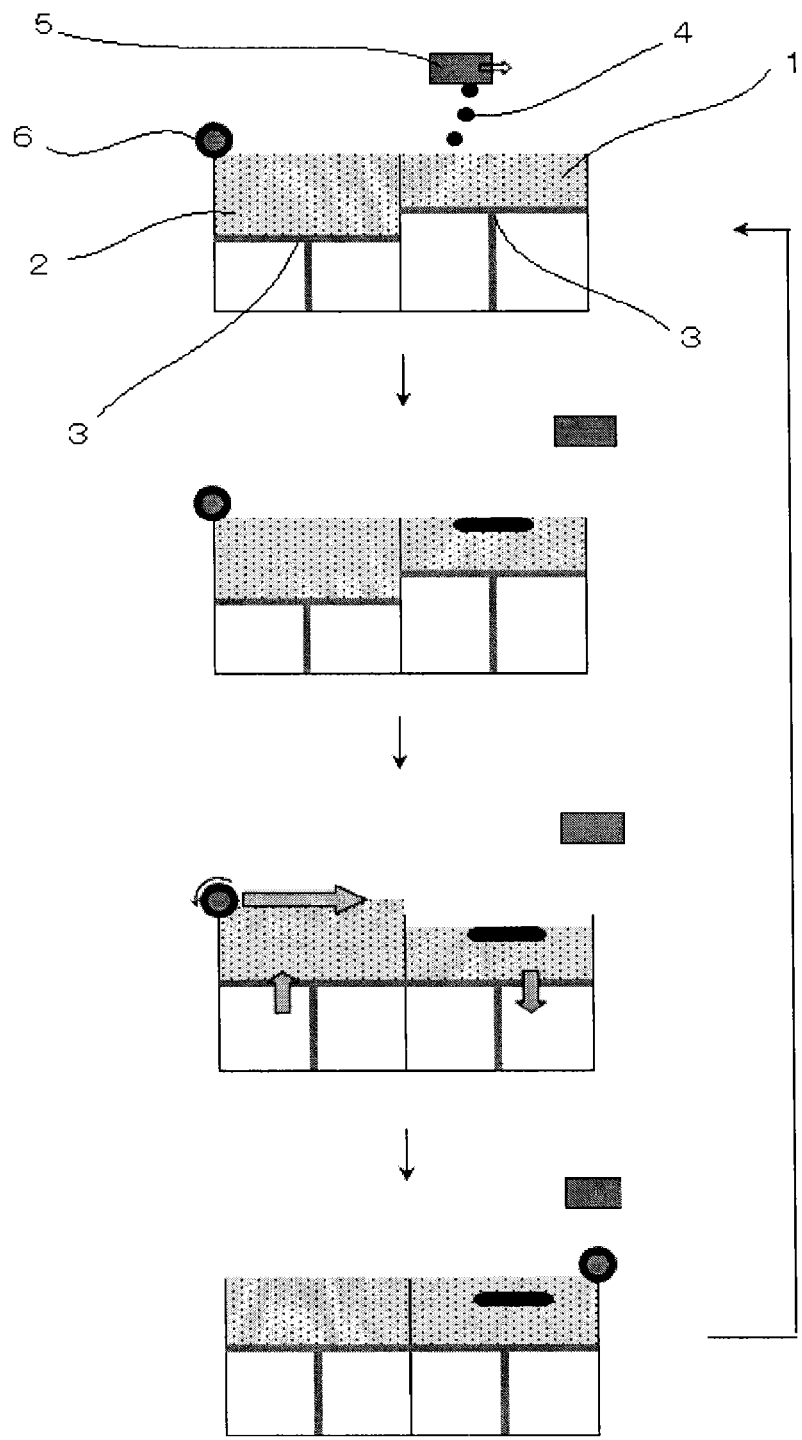
FIG. 1 is a schematic diagram illustrating a powder additive manufacturing apparatus according to an embodiment of the present invention.

DETAILED DESCRIPTION OF THE INVENTION (Liquid Material for Forming Three-Dimensional Object)

A liquid material for forming a three-dimensional object of the present invention is used for forming a three-dimensional object made of a powder material for forming a three-dimensional object containing an organic material and a base material. The liquid material for forming a three-dimensional object contains a cross-linking agent cross-linkable with the organic material and a water-soluble resin having a weight average molecular weight of greater than or equal to 50,000, preferably contains a stabilizing agent and a solvent, and further contains other components as needed.

The liquid material for forming a three-dimensional object is used for hardening the powder material for forming a three-dimensional object. A state obtained by the "hardening" refers to a state of particles of the base material adhering to or agglomerating with each other via the organic material. The hardening enables the powder material for forming a three-dimensional object to retain a constant three-dimensional shape.

When the liquid material for forming a three-dimensional object is delivered to the organic material contained in the powder material for forming a three-dimensional object, the organic material is dissolved by the solvent contained in the liquid material for forming a three-dimensional object and cross-linked by the action of the cross-linking agent contained in the liquid material for forming a three-dimensional object.

—Water-Soluble Resin—

The water-soluble resin is not particularly limited, and an arbitrary water-soluble resin may be selected according to the purpose so long as the water-soluble resin has a weight average molecular weight of greater than or equal to 50,000. However, polyvinyl pyrrolidone (PVP), polyethylene glycol, etc. are preferable, and polyvinyl pyrrolidone is particularly preferable.

The polyvinyl pyrrolidone is a water-soluble polymer, and has been hitherto used as a dispersant for dispersing a pigment in a water-based ink for recording containing a typical pigment as a colorant.

The liquid material for forming a three-dimensional object of the present invention has no need for a pigment to be dispersed, but contains the polyvinyl pyrrolidone in order to obtain an excellent force of the polyvinyl pyrrolidone to adhere to base materials such as metals and ceramics and to obtain storage stability. Particularly, in production of a three-dimensional object with a base material having a high specific gravity such as a metal, a high adhesive force of the polyvinyl pyrrolidone is significantly effective for retaining a shape of a three-dimensional object.

A weight average molecular weight of the water-soluble resin is greater than or equal to 50,000, and preferably greater than or equal to 700,000. A water-soluble resin having the weight average molecular weight of greater than or equal to 50,000 provides a mixture of the organic material dissolved upon delivery of the liquid material for forming a three-dimensional object and the water-soluble resin contained in the liquid material for forming a three-dimensional object with a solidified strength sufficient for retaining a shape of a three-dimensional object when the mixture is solidified. A water-soluble resin having the weight average molecular weight of greater than or equal to 700,000 can be sufficient for retaining the shape of the three-dimensional object even when added in a lower amount than when any other water-soluble resin having the weight average molecular weight of less than 700,000 is used.

The weight average molecular weight of the water-soluble resin can be obtained by, for example, calculation based on a molecular weight distribution of an isolated water-soluble resin obtained according to a gel permeation chromatography (GPC) method.

A content of the water-soluble resin has no particular limit and may be appropriately selected according to the purpose. However, the content is preferably greater than or equal to 0.1% by mass but less than or equal to 5% by mass of the whole amount of the liquid material for forming a three-dimensional object. In the preferable value range of the content, the water-soluble resin has an improved force of adhering to base materials such as metals and imparts a favorable storage stability to the liquid material for forming a three-dimensional object.

—Solvent—

The solvent is not particularly limited, and an arbitrary solvent may be selected according to the purpose so long as the solvent is capable of dissolving the organic material contained in the powder material for forming a three-dimensional object. Examples of the solvent include water and organic solvents. One of these may be used alone, or two or more of these may be used in combination.

The water is not particularly limited, and arbitrary water may be selected according to the purpose. Examples of the water include pure water or ultrapure water such as ion-exchanged water, ultrafiltrated water, reverse osmotic water, and distilled water.

A content of the water in the liquid material for forming a three-dimensional object is preferably greater than or equal to 40% by mass but less than or equal to 95% by mass, and more preferably greater than or equal to 50% by mass but less than or equal to 85% by mass. When the content of the water is greater than or equal to 40% by mass, the water can sufficiently dissolve a water-soluble polymer that may be used as the organic material of the powder material for forming a three-dimensional object. This improves the strength of a hardened product. When the content of the water is less than or equal to 95% by mass, inkjet nozzles can be prevented from being dried during a waiting time. This prevents nozzle clogging.

The organic solvent is not particularly limited, and an arbitrary organic solvent may be selected according to the purpose. Examples of the organic solvent include ethanol, 1,2,6-hexanetriol, 1,2-butanediol, 1,2-hexanediol, 1,2-pentanediol, 1,3-dimethyl-2-imidazolidinone, 1,3-butanediol, 1,3-propanediol, 1,4-butanediol, 1,5-pentanediol, 1,6-hexanediol, 2,2-dimethyl-1,3-propanediol, 2,3-butanediol, 2,4-pentanediol, 2,5-hexanediol, 2-ethyl-1,3-hexanediol, 2-pyrrolidone, 2-methyl-1,3-propanediol, 2-methyl-2,4-pentanediol, 3-methyl-1,3-butanediol, 3-methyl-1,3-hexanediol, N-methyl-2-pyrrolidone, N-methyl pyrrolidinone, β-butoxy-N,N-dimethyl propion amide, β-methoxy-N,N-dimethyl propion amide, γ-butyrolactone, ε-caprolactam, ethylene glycol, ethylene glycol-n-butyl ether, ethylene glycol-n-propyl ether, ethylene glycol phenyl ether, ethylene glycol mono-2-ethyl hexyl ether, ethylene glycol monoethyl ether, glycerin, diethylene glycol, diethylene glycol-n-hexyl ether, diethylene glycol methyl ether, diethylene glycol monoethyl ether, diethylene glycol monobutyl ether, diethylene glycol monomethyl ether, diglycerin, dipropylene glycol, dipropylene glycol-n-propyl ether, dipropylene glycol monomethyl ether, dimethyl sulfoxide, sulfolane, thiodiglycol, tetraethylene glycol, triethylene glycol, triethylene glycol ethyl ether, triethylene glycol dimethyl ether, triethylene glycol monobutyl ether, triethylene glycol methyl ether, tripropylene glycol, tripropylene glycol-n-propyl ether, tripropylene glycol methyl ether, trimethylol ethane, trimethylol propane, propyl propylene diglycol, propylene glycol, propylene glycol-n-butyl ether, propylene glycol-t-butyl ether, propylene glycol phenyl ether, propylene glycol monoethyl ether, hexylene glycol, polyethylene glycol, polypropylene glycol, aliphatic hydrocarbons, ketone-based solvents such as methyl ethyl ketone, ester-based solvents such as ethyl acetate, and ether-based solvents such as glycol ether. One of these may be used alone, or two or more of these may be used in combination.

Among these, aqueous solvents such as alcohols (e.g., ethanol), ether-based solvents, and ketone-based solvents are preferable in terms of environmental hazardousness and discharging stability (i.e., a small temporal viscosity change) of the liquid material for forming a three-dimensional object in delivery of the liquid material for forming a three-dimensional object according to an inkjet method.

Further, it is preferable to use an organic solvent having a vapor pressure of higher than or equal to 10 mmHg at 100° C. because such an organic solvent exhibits a favorable drying property after a three-dimensional object is formed and improves the strength of the three-dimensional object (hardened product). Examples of the organic solvent having a vapor pressure of higher than or equal to 10 mmHg at 100° C. include 3-methyl-1,3-butanediol, propylene glycol, 2,3-butanediol, 1,2-butanediol, and 1,3-butanediol.

A content of the organic solvent has no particular limit and may be appropriately selected in consideration of the components to be blended such as the cross-linking agent, deliverability or handleability of the liquid material for forming a three-dimensional object, productivity of a three-dimensional object, etc. However, the content is preferably greater than or equal to 1% by mass but less than or equal to 50% by mass, and more preferably greater than or equal to 10% by mass but less than or equal to 40% by mass of the whole amount of the liquid material for forming a three-dimensional object. When the content is greater than or equal to 1% by mass, the liquid material for forming a three-dimensional object has an adequate water retaining force, can prevent inkjet nozzles from being dried during a waiting time, and does not cause nozzle clogging. When the content is less than or equal to 50% by mass, the liquid material for forming a three-dimensional object has an adequate viscosity, has a favorable discharging stability, can be easily dried after a three-dimensional object is formed, and improves the strength of the three-dimensional object (hardened product).

—Cross-Linking Agent—

The cross-linking agent is not particularly limited, and an arbitrary cross-linking agent may be selected according to the purpose so long as the cross-linking agent has a property of being capable of cross-linking the organic material contained in the powder material for forming a three-dimensional object. Examples of the cross-linking agent include a metal salt, a metal complex, an organozirconium compound, an organotitanium compound, and a chelate agent.

Examples of the organozirconium compound include zirconium oxychloride, ammonium zirconium carbonate, and ammonium zirconium lactate.

Examples of the organotitanium compound include titanium acylate and titanium alkoxide.

One of these may be used alone, or two or more of these may be used in combination. Among these, a metal salt is more preferable.

Preferable examples of the metal salt include metal salts that ionize a divalent or higher cationic metal in water. Preferable specific examples of the metal salt include zirconium oxychloride octahydrate (tetravalent), aluminium hydroxide (trivalent), magnesium hydroxide (divalent), a titanium lactate ammonium salt (tetravalent), basic aluminium acetate (trivalent), a zirconium carbonate ammonium salt (tetravalent), titanium triethanol aminate (tetravalent), glyoxylate, and a zirconium lactate ammonium salt. Among these, zirconium compounds are preferable, and ammonium zirconium carbonate is particularly preferable because these zirconium compounds impart an excellent strength to a three-dimensional object to be obtained.

These metal salts may be commercially available products. Examples of the commercially-available products include zirconium oxychloride octahydrate (zirconium oxychloride available from Daiichi Kigenso Kagaku Kogyo Co., Ltd.), aluminium hydroxide (available from Wako Pure Chemical Industries, Ltd.), magnesium hydroxide (available from Wako Pure Chemical Industries, Ltd.), a titanium lactate ammonium salt (ORGATIX TC-300 available from Matsumoto Fine Chemical Co., Ltd.), a zirconium lactate ammonium salt (ORGATIX ZC-300 available from Matsumoto Fine Chemical Co., Ltd.), basic aluminium acetate (available from Wako Pure Chemical Industries, Ltd.), a bis-vinyl sulfone compound (VS-B (K-FJC) available from Fuji Fine Chemical Co., Ltd.), a zirconium carbonate ammonium salt (ZIRCOZOL AC-20 available from Daiichi Kigenso Kagaku Kogyo Co., Ltd.), titanium triethanol aminate (ORGATIX TC-400 available from Matsumoto Fine Chemical Co., Ltd.), glyoxylate (SAFELINK SPM-01 available from Nippon Synthetic Chemical Industry Co., Ltd.), and adipic acid dihydrazide (available from Otsuka Chemical Co., Ltd.).

The "cross-linking agent" in the present invention refers to a compound that has a site capable of having a cross-linking reaction with a functional group of a target of cross-linking (an organic material such as a polymer), and by having a cross-linking reaction, itself becomes a constituent element of a bonded site of a cross-linked bond between target points of cross-linking. Hence, the cross-linking agent is conceptually different from a so-called "initiator" such as a peroxide (organic peroxide) and a reducing substance that itself does not become a constituent element of a cross-linked bonded site, but initiates or promotes a radical reaction by itself pyrolyzing or photolyzing to produce free radicals, having the free radicals added to unsaturated monomers to open double bonds and simultaneously produce a new radical reaction, and repeating this process to promote polymerization, or by abstracting hydrogen atoms bound to carbon atoms of saturated compounds to produce new radicals, and having the produced radicals recombine to form a bridge between the saturated compounds. Therefore, the "initiator" is clearly distinguished from the "cross-linking agent" of the present invention.

—Stabilizing Agent—

The liquid material for forming a three-dimensional object may undergo a significant viscosity change depending on the kinds and combinations of the solvent and the cross-linking agent or on storage conditions. Therefore, the liquid material for forming a three-dimensional object needs to have storage stability in consideration of use or storage in the summertime.

Particularly, the liquid material for forming a three-dimensional object containing as the cross-linking agent, a zirconium carbonate ammonium salt capable of imparting an excellent strength to a three-dimensional object tends to undergo a viscosity change during storage. Therefore, a stabilizing agent is an important additive for satisfying both of strength of a three-dimensional object and storage stability of the liquid material for forming a three-dimensional object.

The stabilizing agent is not particularly limited, and an arbitrary stabilizing agent may be selected according to the purpose so long as the stabilizing agent has a property of suppressing viscosity change of the liquid material for forming a three-dimensional object and maintaining storage stability of the liquid material for forming a three-dimensional object. For example, at least one compound selected from the group consisting of an amino group-containing compound, a phosphono group-containing compound, a gluconic acid, and salts of the gluconic acid is preferable.

The amino group-containing compound is preferably any one of an amino group-containing polyvalent alcohol, a hydroxyl group-containing amine compound, and an amino group-containing chelate agent.

The amino group-containing polyvalent alcohol is preferably a divalent alcohol or a trivalent alcohol. Examples include 2-amino-2-methyl-1,3-propanecliol (AMPD), 2-amino-2-ethyl-1,3-propanediol (AEPD), 2-dimethylamino-2-hydroxymethyl-1,3-propanediol, and 2-amino-2-hydroxymethyl-1,3-propanediol (AHMPD).

Examples of the hydroxyl group-containing amine compound include triethanol amine.

Examples of the amino group-containing chelate agent include dihydroxy ethyl glycine (DHEG) or salts of DHEG.

Examples of the phosphono group-containing compound include an amino trimethylene phosphonic acid (NTMP) or salts of NTMP, a phosphono butane tricarboxylic acid (PBTC) or salts of PBTC, and a hydroxyethane diphosphonic acid (HEDP) or salts of HEDP.

Examples of the gluconic acid or the salts of the gluconic acid include a gluconic acid and sodium gluconate.

Among these stabilizing agents, sodium gluconate, 2-amino-2-ethyl-1,3-propanediol (AEPD), a dihydroxy ethyl glycine salt, and triethanol amine are preferable, and 2-amino-2-ethyl-1,3-propanediol (AEPD) is more preferable in terms of strength of a three-dimensional object and storage stability of the liquid material for forming a three-dimensional object.

A content of the stabilizing agent has no particular limit and may be appropriately selected according to the kind and content of the cross-linking agent contained in the liquid material for forming a three-dimensional object and other components. However, the content is preferably greater than or equal to 0.1% by mass but less than or equal to 5% by mass of the whole amount of the liquid material for forming a three-dimensional object.

In the preferable value range of the content, the stabilizing agent can suppress viscosity change of the liquid material for forming a three-dimensional object and maintain storage stability of the liquid material for forming a three-dimensional object.

<Other Components>

Examples of the other components that may be added as needed include additives such as a surfactant, a defoamer, a pH adjustor, an antiseptic/fungicide, a chelate agent, and an anti-rust agent.

—Rate of Viscosity Change—

It is preferable that a rate of viscosity change of the liquid material for forming a three-dimensional object between before and after the liquid material for forming a three-dimensional object is left to stand still at 50° C. for thirty days be lower than 20%, more preferably lower than 10%, and yet more preferably lower than 5%.

When the rate of viscosity change is lower than 20%, the liquid material for forming a three-dimensional object has an adequate storage stability, has a favorable discharging stability when the liquid material for forming a three-dimensional object is delivered according to an inkjet method, and is capable of producing a three-dimensional object having a complicated shape with a good dimensional precision and with a sufficient strength.

The rate of viscosity change between before and after standing still at 50° C. for thirty days can be measured in the manner described below.

The liquid material for forming a three-dimensional object is left to stand still in a thermostat bath of 50° C. for thirty days while being put in a wide-mouthed bottle made of polypropylene (50 mL), then taken out from the thermostat bath, and then left to stand still until the liquid material for forming a three-dimensional object becomes room temperature (25° C.). After this, the viscosity of the liquid material for forming a three-dimensional object is measured. The rate of viscosity change is calculated according to the formula below where viscosity before storage refers to the viscosity of the liquid material for forming a three-dimensional object before put in the thermostat bath and viscosity after storage refers to the viscosity of the liquid material for forming a three-dimensional object after taken out from the thermostat bath. The viscosity before storage and the viscosity after storage can be measured with an R viscometer (available from Toki Sangyo Co., Ltd.) at 25° C.

Rate of viscosity change (%)=[(viscosity after storage)−(viscosity before storage)]/(viscosity before storage)×100

The viscosity of the liquid material for forming a three-dimensional object before storage is preferably lower than or equal to 25 mPa·s, more preferably higher than or equal to 3 mPa·s but lower than or equal to 20 mPa·s, and yet more preferably higher than or equal to 3 mPa·s but lower than or equal to 10 mPa·s at 25° C. When the viscosity is lower than or equal to 25 mPa·s, the liquid material for forming a three-dimensional object is discharged from inkjet nozzles stably, and a hardened product formed by delivering the liquid material for forming a three-dimensional object to a layer of the powder material for forming a three-dimensional object has a sufficient strength and a favorable dimensional precision.

The viscosity of the liquid material for forming a three-dimensional object after storage is preferably higher than or equal to 3 mPa·s but lower than or equal to 10 mPa·s at 25° C.

—Surface Tension—

A surface tension of the liquid material for forming a three-dimensional object is preferably less than or equal to 40 N/m, and more preferably greater than or equal to 10 N/m but less than or equal to 30 N/m at 25° C. When the surface tension is less than or equal to 40 N/m, the liquid material for forming a three-dimensional object is discharged from inkjet nozzles stably, and a hardened product formed by delivering the liquid material for forming a three-dimensional object to a layer of the powder material for forming a three-dimensional object has a sufficient strength and a favorable dimensional precision.

The surface tension can be measured with, for example, DY-300 available from Kyowa Interface Science Co., Ltd.

It is preferable that the liquid material for forming a three-dimensional object be alkaline and have a pH level in a range of from 8 through 10.

The pH level can be measured with, for example, a pH meter (HM30R available from DKK-Toa Corporation).

The liquid material for forming a three-dimensional object of the present invention has an excellent storage stability, can be favorably used for quick, efficient production of various three-dimensional objects, and can be particularly favorably used for a material set for forming a three-dimensional object of the present invention and a three-dimensional object producing method and a three-dimensional object producing apparatus of the present invention described below.

(Material Set for Forming Three-Dimensional Object)

A material set for forming a three-dimensional object of the present invention includes a powder material for forming a three-dimensional object and the liquid material for forming a three-dimensional object of the present invention, and further includes other components, etc. as needed.

As described above, the liquid material for forming a three-dimensional object of the present invention contains the cross-linking agent and the water-soluble resin, preferably contains the stabilizing agent and the solvent, and further contains other components as needed.

The cross-linking agent may be included in the material set for forming a three-dimensional object of the present invention in the form of a solid instead of being included in the solvent. The material set for forming a three-dimensional object may be adapted such that the cross-linking agent is mixed with the solvent and prepared as a liquid when used.

<Powder Material for Forming Three-Dimensional Object>

The powder material for forming a three-dimensional object contains a base material and an organic material, preferably contains a base material coated with an organic material, and further contains other components, etc. as needed.

—Base Material—

The base material is not particularly limited, and an arbitrary base material may be selected according to the purpose so long as the base material has a form of a powder or particles. Examples of the constituent material of the base material include metals, ceramics, carbon, polymers, wood, bio-affinitive materials, and sand. Among these, metals and ceramics that can be finally subjected to a sintering treatment are preferable in terms of obtaining a three-dimensional object having a high strength.

It is preferable that the base material be non-reactive with the liquid material for forming a three-dimensional object. Here, being non-reactive means that the base material does not undergo various chemical reactions such as a cross-linking reaction, covalent binding, and ion binding with the liquid material for forming a three-dimensional object.

Preferable examples of the metals include stainless (SUS) steel, iron, copper, titanium, and silver. Examples of the stainless (SUS) steel include SUS316L.

Examples of the ceramics include metal oxides. Specific examples of the metal oxides include silica ($SiO_2$), alumina ($Al_2O_3$), zirconia ($ZrO_2$), and titania ($TiO_2$).

Examples of the carbon include graphite, graphene, carbon nanotube, carbon nanohorn, and fullerene.

Examples of the polymers include known water-insoluble resins.

Examples of the wood include wood chips and cellulose.

Examples of the bio-affinitive materials include a polylactic acid and calcium phosphate.

One of these materials may be used alone, or two or more of these materials may be used in combination.

In the present invention, it is possible to use commercially available products of particles or powders made of these constituent materials as the base material.

Examples of the commercially available products include SUS316L (PSS316L available from Sanyo Special Steel Co., Ltd.), $SiO_2$ (EXCELICA SE-15 available from Tokuyama Corporation), $Al_2O_3$ (TAIMICRON TM-5D available from Taimei Chemicals Co., Ltd.), and $ZrO_2$ (TZ-B53 available from Tosoh Corporation).

A known surface (reforming) treatment may be applied to the base material with a view to enhancing affinity with the organic material, etc.

A volume average particle diameter of the base material has no particular limit and may be appropriately selected according to the purpose. However, the volume average particle diameter is preferably greater than or equal to 0.1 µm but less than or equal to 500 µm, more preferably greater than or equal to 5 µm but less than or equal to 300 µm, and yet more preferably greater than or equal to 15 µm but less than or equal to 250 µm.

When the volume average particle diameter is greater than or equal to 0.1 µm but less than or equal to 500 µm, efficiency of producing a three-dimensional object is excellent with favorable treatability and handleability. When the volume average particle diameter is less than or equal to 500 µm, a filling rate of the powder material for forming a three-dimensional object in a thin layer when a thin layer of the powder material for forming a three-dimensional object is formed is improved. This makes it less likely for voids, etc. to be produced in a three-dimensional object to be obtained.

The volume average particle diameter of the base material can be measured with a known particle diameter measuring instrument, for example, MICROTRAC HRA (available from Nikkiso Co., Ltd.) according to a known method.

A particle size distribution of the base material has no particular limit and may be appropriately selected according to the purpose.

The base material may be of any contour, any surface area, any circularity, any flowability, and any wettability that are appropriately selected according to the purpose.

—Organic Material—

The organic material may be any organic material that has a property of dissolving in the liquid material for forming a three-dimensional object and being cross-linkable by the action of the cross-linking agent contained in the liquid material.

In the present invention, the solubility of the organic material refers to a level that when 1 g of the organic material is mixed and stirred in the liquid material for forming a three-dimensional object having a temperature of 30° C. per 100 g of a solvent contained in the liquid material for forming a three-dimensional object, greater than or equal to 90% by mass of the organic material dissolves.

A viscosity of the organic material in a 4% by mass (w/w %) solution of the organic material at 20° C. is preferably lower than or equal to 40 mPa·s, more preferably higher than or equal to 1 mPa·s but lower than or equal to 35 mPa·s, and particularly preferably higher than or equal to 5 mPa·s but lower than or equal to 30 mPa·s.

When the viscosity is lower than or equal to 40 mPa·s, a hardened product (three-dimensional object) formed of (layers of) the powder material for forming a three-dimensional object and produced by delivering the liquid material to the powder material for forming a three-dimensional object has an improved strength and is less likely to have problems such as a shape collapse during post-treatment or handling such as sintering. Further, the three-dimensional object formed of (layers of) the powder material for forming a three-dimensional object and produced by delivering the liquid material to the powder material for forming a three-dimensional object tends to have an improved dimensional precision.

The viscosity can be measured according to, for example, JIS K7117.

The organic material is not particularly limited, and an arbitrary organic material may be selected according to the purpose. However, a water-soluble organic material is preferable in terms of handleability, environmental hazardousness, etc. Examples of such water-soluble organic materials include water-soluble resins and water-soluble prepolymers. Use of such a water-soluble organic material in the powder material for forming a three-dimensional object enables use of water and an organic solvent as the solvent of the liquid material for forming a three-dimensional object. Furthermore, such a water-soluble organic material can be easily separated from the base material by water treatment in disposal or recycling of the powder material.

Examples of the water-soluble resins include a polyvinyl alcohol resin, a polyacrylic acid resin, a cellulose resin, starch, gelatin, a vinyl resin, an amide resin, an imide resin, an acrylic resin, and polyethylene glycol.

These water-soluble resins may be a homopolymer or a heteropolymer (copolymer), may be modified, may have a known functional group incorporated, or may be in the form of a salt, so long as these water-soluble resins have water solubility.

Hence, the polyvinyl alcohol resin may be a polyvinyl alcohol, a polyvinyl alcohol modified with an acetoacetyl group, an acetyl group, silicone, etc. (e.g., an acetoacetyl group-modified polyvinyl alcohol, an acetyl group-modified polyvinyl alcohol, and a silicone-modified polyvinyl alcohol), or a butanediol vinyl alcohol copolymer, etc. The polyacrylic acid resin may be a polyacrylic acid or a salt such as sodium polyacrylate. The cellulose resin may be a cellulose or a carboxy methyl cellulose (CMC), etc. The acrylic resin may be a polyacrylic acid or an acrylic acid-maleic anhydride copolymer, etc.

Examples of the water-soluble prepolymers include an adhesive water-soluble isocyanate prepolymer contained in a water sealant, etc.

Examples of organic materials and resins that are not water-soluble include acrylic, a maleic acid, silicone, butyral, polyester, polyvinyl acetate, a vinyl chloride/vinyl acetate copolymer, polyethylene, polypropylene, polyacetal, an ethylene/vinyl acetate copolymer, an ethylene/(meth) acrylic acid copolymer, an α-olefin/maleic anhydride-based copolymer, an esterified product of an α-olefin/maleic anhydride-based copolymer, polystyrene, poly(meth)acrylic acid ester, an α-olefin/maleic anhydride/vinyl group-containing monomer copolymer, a styrene/maleic anhydride copolymer, a styrene/(meth)acrylic acid ester copolymer, polyamide, an epoxy resin, a xylene resin, a ketone resin, a petroleum resin, rosin or derivatives of rosin, a coumarone-indene resin, a terpene resin, a polyurethane resin, synthetic rubbers such as a styrene/butadiene rubber, polyvinyl butyral, a nitrile rubber, an acrylic rubber, and an ethylene/propylene rubber, and nitrocellulose.

In the present invention, organic materials containing a cross-linkable functional group are preferable among the organic materials described above. The cross-linkable functional group is not particularly limited, and an arbitrary cross-linkable functional group may be selected according to the purpose. Examples of the cross-linkable functional group include a hydroxyl group, a carboxyl group, an amide group, a phosphoric acid group, a thiol group, an acetoacetyl group, and an ether bond.

It is preferable that the organic material contain the cross-linkable functional group, because this makes it easier for the organic material to be cross-linked and form a hardened product (three-dimensional object). Furthermore, a modified polyvinyl alcohol that has a cross-linkable functional group incorporated into a molecule as described above is preferable. An acetoacetyl group-modified polyvinyl alcohol is particularly preferable. For example, when the polyvinyl alcohol contains the acetoacetyl group, the polyvinyl alcohol has a highly excellent strength owing to the action of a metal in the cross-linking agent contained in the liquid material, because this action allows the acetoacetyl group to easily form a complicated three-dimensional network structure (cross-linked structure) via the metal (i.e., cross-linking reactivity is excellent).

One such acetoacetyl group-modified polyvinyl alcohol may be used alone, or two or more of such acetoacetyl group-modified polyvinyl alcohols different in properties such as viscosity and degree of saponification may be used in combination. It is more preferable to use an acetoacetyl group-modified polyvinyl alcohol resin having an average degree of polymerization of greater than or equal to 400 but less than or equal to 1,100.

One of the organic materials described above may be used alone, or two or more of these may be used in combination. The organic materials may be appropriately synthesized products or commercially available products.

Examples of the commercially available products include polyvinyl alcohols (PVA-205C and PVA-220C available from Kurary Co., Ltd.), a polyacrylic acid (JULIMER AC-10 available from Toagosei Co., Ltd.), sodium polyacrylate (JULIMER AC-103P available from Toagosei Co., Ltd.), acetoacetyl group-modified polyvinyl alcohols (GOHSENX Z-300, GOHSENX Z-100, GOHSENX Z-200, GOHSENX Z-205, GOHSENX Z-210, and GOHSENX Z-220 available from Nippon Synthetic Chemical Industry Co., Ltd.), carboxy group-modified polyvinyl alcohols (GOHSENX T-330, GOHSENX T-350, and GOHSENX T-330T available from Nippon Synthetic Chemical Industry Co., Ltd.), a butanediol vinyl alcohol copolymer (NICHIGO G-POLYMER OKS-8041 available from Nippon Synthetic Chemical Industry Co., Ltd.), carboxy methyl cellulose (CELLOGEN 5A available from Daiichi Kogyo Co., Ltd.), starch (HI-STARD PSS-5 available from Sanwa Starch Co., Ltd.), and gelatin (BEMATRIX GELATIN available from Nitta Gelatin Inc.).

A coating thickness of the organic material over the base material expressed in average thickness is preferably greater than or equal to 5 nm but less than or equal to 1,000 nm, more preferably greater than or equal to 5 nm but less than or equal to 500 nm, yet more preferably greater than or equal to 50 nm but less than or equal to 300 nm, and particularly preferably greater than or equal to 100 nm but less than or equal to 200 nm.

In the present invention, utilization of the hardening action of the cross-linking agent enables a coating thickness smaller than in a typical powder material. This ensures both of strength and precision for even a thin film.

When the average thickness as the coating thickness is greater than or equal to 5 nm, a hardened product (three-dimensional object) formed of (layers of) the powder material for forming a three-dimensional object and produced by delivering the liquid material to the powder material for forming a three-dimensional object has an improved strength, and will not have problems such as a shape collapse during post-treatment or handling such as sintering. When the average thickness is less than or equal to 1,000 nm, the hardened product (three-dimensional object) formed of (layers of) the powder material for forming a three-dimensional object and produced by delivering the liquid material to the powder material for forming a three-dimensional object has an improved dimensional precision.

The average thickness can be measured with, for example, a scanning tunneling microscope (STM), an atomic force microscope (AFM), and a scanning electron microscope (SEM), after the powder material for forming a three-dimensional object is embedded in an acrylic resin or the like and the surface of the base material is exposed by etching or the like.

A coverage (area ratio) by the organic material over the surface of the base material has no particular limit and may be appropriately selected according to the purpose. However, the coverage is preferably greater than or equal to 15%, more preferably greater than or equal to 50%, and particularly preferably greater than or equal to 80%.

When the coverage is greater than or equal to 15%, a hardened product (three-dimensional object) formed of (layers of) the powder material for forming a three-dimensional object and produced by delivering the liquid material to the powder material for forming a three-dimensional object has a sufficient strength, and will not have problems such as a shape collapse during post-treatment or handling such as sintering. Further, the hardened product (three-dimensional object) formed of (layers of) the powder material for forming a three-dimensional object and produced by delivering the liquid material to the powder material for forming a three-dimensional object has an improved dimensional precision.

The coverage can be measured by, for example, observing a photograph of the powder material for forming a three-dimensional object, calculating the ratio (%) of the area coated by the organic material to the whole area of the surface of each particle of the powder material for forming a three-dimensional object captured in the two-dimensional photograph, and averaging the ratios. Alternatively, the coverage can be measured by elemental mapping of the portion coated by the organic material based on energy dispersive X-ray spectrometry such as SEM-EDS.

—Other Components—

The other components are not particularly limited, and arbitrary components may be selected according to the purpose. Examples of the other components include a fluidizer, a filler, a leveling agent, and a sintering aid. It is preferable that the powder material for forming a three-dimensional object contain the fluidizer, because this makes it possible to form a layer, etc. of the powder material for forming a three-dimensional object easily and efficiently. It is preferable that the powder material for forming a three-dimensional object contain the filler, because this makes it less likely for voids, etc. to be produced in a hardened product (three-dimensional object) obtained. It is preferable that the powder material for forming a three-dimensional object contain the leveling agent, because this improves wettability of the powder material for forming a three-dimensional object and facilitates handling, etc. It is preferable that the powder material for forming a three-dimensional object contain the sintering aid, because this makes it possible for a hardened product (three-dimensional object) obtained to be sintered at a lower temperature in a sintering treatment.

—Production of Powder Material for Forming Three-Dimensional Object—

A method for producing the powder material for forming a three-dimensional object is not particularly limited, and an arbitrary method may be selected according to the purpose. Preferable examples of the method include a method for coating the base material with the organic material according to a known coating method.

The method for coating the surface of the base material with the organic material is not particularly limited, and an arbitrary method may be employed from known coating methods. Preferable examples of such known coating methods include tumbling fluidized bed coating, spray drying, a stirring mixing adding method, dipping, and kneader coating. These coating methods can be carried out with known commercially available various coaters and granulators.

—Physical Properties of Powder Material for Forming Three-Dimensional Object—

An average particle diameter of the powder material for forming a three-dimensional object has no particular limit and may be appropriately selected according to the purpose. However, the average particle diameter is preferably greater than or equal to 3 µm but less than or equal to 250 µm, more preferably greater than or equal to 3 µm but less than or equal to 200 µm, yet more preferably greater than or equal to 5 µm but less than or equal to 150 µm, and particularly preferably greater than or equal to 10 µm but less than or equal to 85 µm.

When the average particle diameter is greater than or equal to 3 µm, the powder material has an improved flowability. This makes it easier to form a layer of the powder material and improves smoothness of the surface of a laminated layer. This tends to improve the efficiency of producing an object, and treatability/handleability and dimensional precision of the object. When the average particle diameter is less than or equal to 250 µm, the space between the powder material particles is small. This provides a small voidage in the object and contributes to enhancement of the strength. Hence, an average particle diameter range of greater than or equal to 3 µm but less than or equal to 250 µm is a preferable range for simultaneously satisfying dimensional precision and strength.

A particle size distribution of the powder material for forming a three-dimensional object has no particular limit and may be appropriately selected according to the purpose.

A repose angle of the powder material for forming a three-dimensional object as a property of the powder material for forming a three-dimensional object is preferably less than or equal to 60°, more preferably less than or equal to 50°, and yet more preferably less than or equal to 40°.

When the repose angle is less than or equal to 60°, the powder material for forming a three-dimensional object can be stably placed at a desired location over a supporting member efficiently.

The repose angle can be measured with, for example, a powder characteristic measuring instrument (POWDER TESTER PT-N TYPE available from Hosokawa Micron Corporation).

The powder material for forming a three-dimensional object can be favorably used for quick, efficient production of various objects, and can be particularly favorably used for a three-dimensional object producing method of the present invention and a three-dimensional object producing apparatus of the present invention described below.

It is possible to produce a structure having a complicated three-dimensional shape easily, efficiently, and with a good dimensional precision, only by delivering the liquid material for forming a three-dimensional object of the present invention to the powder material for forming a three-dimensional object of the present invention. The structure obtained in this way is a hardened product (three-dimensional object) having a sufficient hardness, and excellent in treatability and handleability without undergoing a shape collapse even when held in a hand, brought into or out from a mold, or blown with air to remove any excess powder material for forming a three-dimensional object. The hardened product may be used as it is, or as a hardened product to be sintered, may further be subjected to a sintering treatment to be produced as a sintered body of the three-dimensional object. Through the sintering treatment, the sintered body resulting from the sintering includes no unnecessary voids, etc., and a sintered body having a beautiful appearance can be obtained easily.

<Three-Dimensional Object>

It is possible to produce a structure having a complicated, highly-strong three-dimensional shape easily, efficiently, and with a good dimensional precision, only by causing the liquid material for forming a three-dimensional object of the present invention to act on the powder material for forming a three-dimensional object and by performing drying as needed. The structure obtained in this way is a hardened product (three-dimensional object) having a sufficient hardness, and excellent in treatability and handleability without undergoing a shape collapse even when held in a hand, brought into or out from a mold, or blown with air to remove any excess powder material for forming a three-dimensional object. The hardened product may be used as it is, or as a hardened product to be sintered, may further be subjected to a sintering treatment to be produced as a sintered body of the three-dimensional object. Through the sintering treatment, the sintered body resulting from the sintering includes few voids and is dense. Therefore, a sintered body having a beautiful appearance can be obtained easily.

A strength of the three-dimensional object is, for example, a level at which the three-dimensional object does not undergo a shape collapse or the like when the surface of the three-dimensional object is rubbed, and such a level at which the three-dimensional object does not undergo cracking or the like when the three-dimensional object is blown with air from a distance of 5 cm away with an air gun having a nozzle caliber of 2 mm and an air pressure of 0.3 MPa.

(Three-Dimensional Object Producing Method and Three-Dimensional Object Producing Apparatus)

A three-dimensional object producing method of the present invention includes a powder material layer forming step and a liquid material delivering step, and further includes other steps such as a sintering step as needed.

The three-dimensional object producing method features repeating the powder material layer forming step and the liquid material delivering step to produce a three-dimensional object.

A three-dimensional object producing apparatus of the present invention includes a powder material layer forming unit, a liquid material delivering unit, a powder material container in which a powder material is stored, and a liquid material container in which a liquid material for forming a three-dimensional object is stored, and further includes other units such as a liquid material supplying unit and a sintering unit as needed.

—Powder Material Layer Forming Step and Powder Material Layer Forming Unit—

The powder material layer forming step is a step of forming a layer of a powder material for forming a three-dimensional object containing an organic material and a base material.

The powder material layer forming unit is a unit configured to form a layer of a powder material for forming a three-dimensional object containing an organic material and a base material.

It is preferable that the powder material for forming a three-dimensional object be supplied over a supporting member.

—Supporting Member—

The supporting member is not particularly limited, and an arbitrary supporting member may be selected according to the purpose so long as the supporting member can have the powder material for forming a three-dimensional object placed over the supporting member. Examples of the supporting member include a table having a placing surface over which the powder material for forming a three-dimensional object is placed and a base plate of an apparatus illustrated in FIG. 1 of Japanese Unexamined Patent Application Publication No. 2000-328106.

The surface of the supporting member, i.e., the placing surface over which the powder material for forming a three-dimensional object is placed may be a smooth surface, a coarse surface, a flat surface, or a curved surface. It is preferable that the placing surface have a low affinity with the organic material contained in the powder material for forming a three-dimensional object when the organic material is dissolved and cross-linked by the action of the cross-linking agent.

It is preferable that affinity between the placing surface and the dissolved, cross-linked organic material be lower than affinity between the base material and the dissolved, cross-linked organic material, because this makes it easy to detach the obtained three-dimensional object from the placing surface.

—Formation of Powder Material Layer—

A method for placing the powder material for forming a three-dimensional object over the supporting member is not particularly limited, and an arbitrary method may be selected according to the purpose. Preferable examples of a method for placing the powder material for forming a three-dimensional object into a form of, for example, a thin layer include a method using a known counter rolling mechanism (a counter roller) or the like and used in a selective laser sintering method described in Japanese Patent No. 3607300, a method for spreading the powder material for forming a three-dimensional object into a form of a thin layer with a member such as a brush, a roller, and a blade, a method for spreading the powder material for forming a three-dimensional object into a form of a thin layer by pressing the surface of the powder material for forming a three-dimensional object with a pressing member, and a method using a known powder layer laminating apparatus.

For example, in the manner described below, the powder material for forming a three-dimensional object can be placed over the supporting member into a form of a thin layer with the counter rolling mechanism (counter roller), the brush, roller, or blade, the pressing member, etc.

With the counter rolling mechanism (counter roller), the brush, roller, or blade, the pressing member, etc., the powder material for forming a three-dimensional object is placed over the supporting member that is disposed within an outer frame (may also be referred to as "mold", "hollow cylinder", "tubular structure", etc.) such that the supporting member can be lifted up or down while sliding over the inner wall of the outer frame. In the case where the supporting member is a member that can be lifted up or down within the outer frame, the supporting member is disposed at a position slightly below the upper end opening of the outer frame, i.e., at a position below the upper end opening by what corresponds to a thickness of a layer of the powder material for forming a three-dimensional object, and then the powder material for forming a three-dimensional object is placed over the supporting member. In this way, the powder material for forming a three-dimensional object can be placed over the supporting member into a form of a thin layer.

When the liquid material for forming a three-dimensional object is caused to act on the powder material for forming a three-dimensional object that is placed into a form of a thin layer in this way, the layer is hardened.

Then, when the powder material for forming a three-dimensional object is placed into a form of a thin layer in the same manner as described above over the obtained hardened product of the thin layer, and the liquid material is caused to act on (the layer of) the powder material for forming a three-dimensional object placed into the form of a thin layer, hardening occurs. This hardening occurs not only in (the layer of) the powder material for forming a three-dimensional object placed into the form of a thin layer, but also in the underlying hardened product of the thin layer obtained by the previous hardening. As a result, a hardened product (three-dimensional object) having a thickness corresponding to about two layers of the powder material for forming a three-dimensional object placed into the form of a thin layer is obtained.

Further, an automatic, quick manner using the known powder layer laminating apparatus may be employed to place the powder material for forming a three-dimensional object over the supporting member into a form of a thin layer. Typically, the powder layer laminating apparatus includes a recoater configured to laminate a layer of the powder material for forming a three-dimensional object, a movable supplying tank configured to supply the powder material for forming a three-dimensional object onto the supporting member, and a movable forming tank in which the powder material for forming a three-dimensional object is placed into a form of a thin layer and such layers are laminated. In the powder layer laminating apparatus, it is possible to constantly dispose the surface of the supplying tank slightly above the surface of the forming tank by lifting up the supplying tank, by lifting down the forming tank, or by both, it is possible to place the powder material for forming a three-dimensional object into a form of a thin layer by actuating the recoater from the supplying tank side, and it is possible to laminate thin layers of the powder material for forming a three-dimensional object by repeatedly moving the recoater.

A thickness of a layer of the powder material for forming a three-dimensional object has no particular limit and may be appropriately selected according to the purpose. For example, an average thickness per layer is preferably greater than or equal to 30 µm but less than or equal to 500 µm, and more preferably greater than or equal to 60 µm but less than or equal to 300 µm.

When the thickness is greater than or equal to 30 µm, a hardened product (three-dimensional object) formed of (layers of) the powder material for forming a three-dimensional object and produced by delivering the liquid material to the powder material for forming a three-dimensional object has a sufficient strength, and will not have problems such as a shape collapse during post-treatment or handling such as sintering. When the thickness is less than or equal to 500 µm, the hardened product (three-dimensional object) formed of (layers of) the powder material for forming a three-dimensional object and produced by delivering the liquid material to the powder material for forming a three-dimensional object has an improved dimensional precision.

The average thickness has no particular limit and can be measured according to a known method.

—Liquid Material Delivering Step and Liquid Material Delivering Unit—

The liquid material delivering step is a step of delivering a liquid material for forming a three-dimensional object to a predetermined region of the layer of the powder material formed in the powder material layer forming step.

The liquid material delivering unit is a unit configured to deliver a liquid material for forming a three-dimensional object to a predetermined region of the layer of the powder material formed by the powder material layer forming unit.

A method for delivering the liquid material for forming a three-dimensional object to the powder material is not particularly limited, and an arbitrary method may be selected according to the purpose. Examples of the method include a dispenser method, a spray method, and an inkjet method. For carrying out these methods, known apparatuses can be favorably used as the liquid material delivering unit.

Among these, the dispenser method has excellent quantitativity of liquid droplets, but has a small coating coverage. The spray method can form a minute discharge of the material easily and has a wide coating coverage and excellent coatability, but has a poor quantitativity of liquid droplets and causes powder scattering due to a spray current. Hence, in the present invention, the inkjet method is particularly preferable. The inkjet method is preferable because the inkjet method is better than the spray method in quantitativity of liquid droplets, can obtain a greater coating coverage than can be obtained by the dispenser method, and can form a complicated three-dimensional shape with a good precision efficiently.

In the case of the inkjet method, the liquid material delivering unit includes nozzles capable of delivering the liquid material for forming a three-dimensional object to the powder material according to the inkjet method. Nozzles (discharging heads) of a known inkjet printer can be favorably used as the nozzles, and the inkjet printer can be favorably used as the liquid material delivering unit. Preferable examples of the inkjet printer include SG7100 available from Ricoh Company, Ltd. The inkjet printer is preferable because the inkjet printer can realize rapid coating owing to the capability of dropping the liquid material from the heads in a large amount at a time and coating a large area.

In the present invention, the liquid material for forming a three-dimensional object of the present invention advantageously allows use of the inkjet printer capable of delivering the liquid material precisely and highly efficiently, because the liquid material, which is free of solid matters such as particles and macromolecular high-viscosity materials such as resins, does not cause clogging, corroding, etc. of the nozzles or the nozzle heads of the inkjet printer, realizes an excellent efficiency of producing a three-dimensional object because the liquid material can efficiently permeate the organic material contained in the powder material for forming a three-dimensional object when delivered (discharged) onto a layer of the powder material for forming a three-dimensional object, and enables a cross-linked product having a good dimensional precision to be obtained easily, in a short time, and efficiently without letting the cross-linked product undergo an unexpected volume increase or the like because there is no delivery of macromolecular components such as resins.

—Powder Material Container—

The powder material container is a member in which the powder material for forming a three-dimensional object is stored and may be of any size, form, and material that may be appropriately selected according to the purpose. Examples of the powder material container include a storing reservoir, a bag, a cartridge, and a tank.

—Liquid Material Container—

The liquid material container is a member in which the liquid material for forming a three-dimensional object is stored and may be of any size, form, and material that may be appropriately selected according to the purpose. Examples of the liquid material container include a storing reservoir, a bag, a cartridge, and a tank.

—Other Steps and Other Units—

Examples of the other steps include a drying step, a sintering step, a surface protection treatment step, and a painting step.

Examples of the other units include a drying unit, a sintering unit, a surface protection treatment unit, and a painting unit.

The drying step is a step of drying a hardened product (three-dimensional object) obtained in the liquid material delivering step. In the drying step, not only may the water contained in the hardened product be removed, but also any organic material contained in the hardened product may be removed (dewaxed). Examples of the drying unit include known dryers.

The sintering step is a step of sintering the hardened product (three-dimensional object) formed in the liquid material delivering step. Through the sintering step, the hardened product can be made into a sintered body of the three-dimensional object formed of a monolithic metal or ceramic. Examples of the sintering unit include known sintering furnaces.

The surface protection treatment step is a step of performing formation, etc. of a protective layer over the hardened product (three-dimensional object) formed in the liquid material delivering step. With the surface protection treatment step, durability or the like that, for example, enables the hardened product (three-dimensional object) to be used as it is can be imparted to the surface of the hardened product (three-dimensional object). Specific examples of the protective layer include a water-resistant layer, a weatherable layer, a light-resistant layer, a heat-insulating layer, and a gloss layer. Examples of the surface protection treatment unit include known surface protection treatment apparatuses such as spray apparatuses and coating apparatuses.

The painting step is a step of painting the hardened product (three-dimensional object) formed in the liquid material delivering step. With the painting step, the hardened product (three-dimensional object) can be colored in a desired color. Examples of the painting unit include known painting apparatuses such as painting apparatuses using a spray, a roller, a brush, etc.

FIG. 1 illustrates a powder additive manufacturing apparatus according to an embodiment of the present invention. The powder additive manufacturing apparatus of FIG. 1 includes a forming-side powder storing tank 1 and a supplying-side powder storing tank 2. Each of the powder storing tanks includes a stage 3 movable upward and downward and stores a powder material for forming a three-dimensional object over the stage.

The powder additive manufacturing apparatus includes an inkjet head 5 that is disposed above the forming-side powder storing tank 1 and configured to discharge a liquid material 4 for forming a three-dimensional object toward the powder material for forming a three-dimensional object in the forming-side powder storing tank 1. The powder additive manufacturing apparatus also includes a leveling mechanism 6 (hereinafter may be referred to as recoater) configured to supply the powder material for forming a three-dimensional object from the supplying-side powder storing tank 2 to the forming-side powder storing tank 1 and level the surface of the powder material for forming a three-dimensional object in the forming-side powder storing tank 1.

The liquid material for forming a three-dimensional object is dropped from the inkjet head 5 onto the powder material for forming a three-dimensional object in the forming-side powder storing tank 1. The position to which the liquid material for forming a three-dimensional object is dropped is determined based on two-dimensional image data (slice data) representing a plurality of planer layers into which a three-dimensional shape finally desired is sliced.

When printing over one layer is completed, the stage 3 of the supplying-side powder storing tank 2 is lifted up, and the stage 3 of the forming-side powder storing tank 1 is lifted down, which produces a height difference. An amount of the powder material for forming a three-dimensional object corresponding to the height difference is moved to the forming-side powder storing tank 1 by the leveling mechanism 6.

In this way, a new layer of the powder material for forming a three-dimensional object is formed over the surface of the powder material for forming a three-dimensional object over which printing is performed previously. A thickness of one layer of the powder material for forming a three-dimensional object is greater than or equal to about some tens of micrometers but less than or equal to 100 μm.

Then, printing is performed over the newly formed layer of the powder material for forming a three-dimensional object based on the slice data of the second layer. This serial process is repeated to obtain an object. The object is heated and dried by an unillustrated heating unit to obtain a final object.

Figure 2:
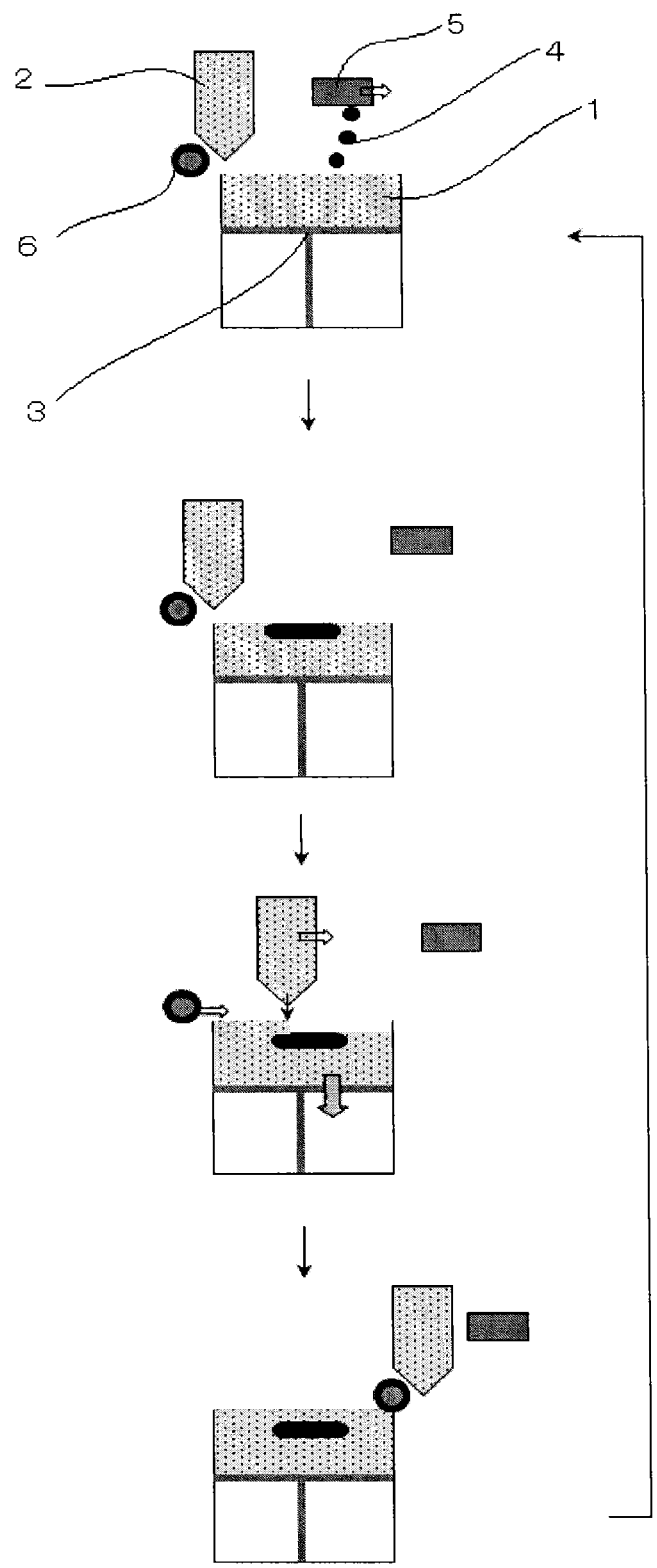
FIG. 2 is a schematic diagram illustrating a powder additive manufacturing apparatus according to another embodiment of the present invention.

FIG. 2 illustrates a powder additive manufacturing apparatus according to another embodiment of the present invention. The powder additive manufacturing apparatus of FIG. 2 is identical with the powder additive manufacturing apparatus of FIG. 1 in principle but different from the powder additive manufacturing apparatus of FIG. 1 in the mechanism of supplying the powder material for forming a three-dimensional object. That is, the supplying-side powder storing tank 2 is disposed above the forming-side powder storing tank 1. When printing over one layer is completed, the stage 3 of the forming-side powder storing tank 1 lifts down by a predetermined amount, and the supplying-side powder storing tank 2 moves while dropping the powder material for forming a three-dimensional object in a predetermined amount into the forming-side powder storing tank 1 to form a new layer of the powder material for forming a three-dimensional object. After this, the leveling mechanism 6 compresses the powder material for forming a three-dimensional object to increase the bulk density of the powder material for forming a three-dimensional object and level off the powder material for forming a three-dimensional object to a uniform height.

The powder additive manufacturing apparatus having the configuration of FIG. 2 can be made smaller in size than the powder additive manufacturing apparatus having the configuration of FIG. 1 in which two powder storing tanks are arranged horizontally.

The above-described three-dimensional object producing method and three-dimensional object producing apparatus of the present invention can produce a three-dimensional object having a complicated stereoscopic (three-dimensional (3D)) shape with the above-described liquid material for forming a three-dimensional object or material set for forming a three-dimensional object of the present invention easily, efficiently, without the risk of a shape collapse before sintering, etc., and with a good dimensional precision.

The three-dimensional object obtained in this way has a sufficient strength and an excellent dimensional precision, can provide a dense sintered body including few voids, and can reproduce minute asperity, curved surfaces, etc. Therefore, the three-dimensional object has an excellent aesthetic appearance and a high quality, and can be favorably used for various purposes.

EXAMPLES

Examples of the present invention will be described below. However, the present invention is not limited to these Examples by any means.

Production Example 1 for Producing Powder Material for Forming Three-Dimensional Object —Preparation of Coating Liquid 1—

An acetoacetyl group-modified polyvinyl alcohol, which was a water-soluble resin (GOHSENX Z-100 available from Nippon Synthetic Chemical Industry Co., Ltd., with an average degree of polymerization of 500 and a degree of saponification of 98.5 mol %) (6 parts by mass) was mixed with water (114 parts by mass). Then, while being heated to 90° C. in a water bath, the acetoacetyl group-modified polyvinyl alcohol and the water were stirred with a three-one motor (BL600 available from Shinto Scientific Co., Ltd.) for 1 hour, to dissolve the acetoacetyl group-modified polyvinyl alcohol in the water. In this way, a 5% by mass acetoacetyl group-modified polyvinyl alcohol aqueous solution (120 parts by mass) was prepared. The obtained preparation liquid was used as a coating liquid 1.

The viscosity of the acetoacetyl group-modified polyvinyl alcohol in a 4% by mass (w/w %) aqueous solution at 20° C. was measured with a viscometer (DV-E VISCOMETER HADVE 115 TYPE, which was a rotary viscometer available from Brookfield Engineering Laboratories), and turned out to be in a range of from 5.0 mPa·s through 6.0 mPa·s.

—Coating of Coating Liquid 1 Over Surface of Base Material—

Next, as the base material, a powder of a stainless steel (SUS316L) (PSS316L available from Sanyo Special Steel Co., Ltd., with a volume average particle diameter of 41 μm) (100 parts by mass) was coated with the coating liquid 1 to a coating thickness (average thickness) of 100 nm with a commercially available coating apparatus (MP-01 available from Powrex Corp.). Halfway through this coating, the coating thickness (average thickness) of the coating liquid 1 and a coating coverage (%) were sampled at appropriate timings to adjust the coating time and intervals appropriately to obtain a coating thickness (average thickness) of 100 nm and a coating coverage (%) of 100%. In the way described above, a powder material 1 for forming a three-dimensional object was produced. Methods for measuring the coating thickness and the surface coating coverage and conditions for the coating are presented below.

<Coating Thickness (Average Thickness)>

For measurement of the coating thickness (average thickness), the surface of the powder material 1 for forming a three-dimensional object was polished with emery paper, and then lightly polished with a cloth impregnated with water to dissolve the resin portion and produce a sample for observation. Next, the exposed and surfaced boundary portion between the base material portion and the resin portion was observed with a field emission scanning electron microscope (FE-SEM), and the length between the surface of the resin portion and the boundary portion was measured as a coating thickness. An average value of ten measurement points was calculated as the coating thickness (average thickness).

<Surface Coating Coverage>

With a field emission scanning electron microscope (FE-SEM), a reflected electron image (ESB) was captured under the conditions described below under a viewing field setting that enabled about ten particles of the powder material 1 for forming a three-dimensional object to fall within a screen. The reflected electron image was then binarized according to image processing by IMAGEJ software. The coverage was calculated according to the area of black portions per particle/(area of black portions+area of white portions)×100, where black portions were coated portions and white portions were base material portions. Ten particles were measured, and the average value of the ten particles was calculated as the surface coating coverage (%).

—SEM Observation Conditions—

Signal: ESB (reflected electron image)
EHT: 0.80 kV
ESB Grid: 700 V
WD: 3.0 mm
Aperture size: 30.00 μm
Contrast: 80%
Magnification: set for each sample such that about ten particles fell within the screen in the lateral direction <Coating Conditions>

Spray settings
Nozzle type: 970
Nozzle caliber: 1.2 mm
Coating liquid discharging pressure: 4.7 Pa·s
Coating liquid discharging rate: 3 g/min
Amount of air atomized: 50 NL/min
Rotor settings
Rotor type: M-1
Rotational speed: 60 rpm
Number of rotations: 400%
Air current settings
Air feeding temperature: 80° C.
Air feeding rate: 0.8 m$^3$/min
Filtering pressure of a bag filter: 0.2 MPa
Filtering time of a bag filter: 0.3 seconds
Bag filter intervals: 5 seconds
Coating time: 40 minutes An average particle diameter of the produced powder material 1 for forming a three-dimensional object was measured with a commercially available particle diameter measuring instrument (MICROTRAC HRA available from Nikkiso Co., Ltd.), and turned out to be 43 μm. For flowability, a repose angle of the powder material 1 for forming a three-dimensional object was measured with a commercially available repose angle measuring instrument (POWDER TESTER PT-N TYPE available from Hosokawa Micron Corporation), and turned out to be 35°. A larger repose angle measurement tends to mean a poorer flowability.

—Preparation of Liquid Material 1 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-90 as a water-soluble resin (available from BASF GmbH, with a weight average molecular weight of 1,400,000) (0.1 parts by mass) were subjected to a dispersion treatment using a homomixer for 30 minutes, to prepare a liquid material 1 for forming a three-dimensional object.

Storage stability of the produced liquid material 1 for forming a three-dimensional object was evaluated in the manner described below. The result is presented in Table 1.

<Storage Stability>

The liquid material 1 for forming a three-dimensional object was left to stand still in a thermostat bath of 50° C. for thirty days while being put in a wide-mouthed bottle made of polypropylene (with a capacity of 50 mL), and then taken out from the thermostat bath. The liquid material 1 for forming a three-dimensional object taken out from the thermostat bath was left to stand still until the liquid material 1 for forming a three-dimensional object became room temperature (25° C.). After this, the viscosity of the liquid material 1 for forming a three-dimensional object was measured. A rate of viscosity change was calculated according to the formula below where viscosity before storage refers to the viscosity of the liquid material 1 for forming a three-dimensional object before put in the thermostat bath and viscosity after storage refers to the viscosity of the liquid material 1 for forming a three-dimensional object after taken out from the thermostat bath. The viscosity before storage and the viscosity after storage were measured with an R viscometer (available from Toki Sangyo Co., Ltd.) at 25° C.

Rate of viscosity change (%)=[(viscosity after storage)−(viscosity before storage)]/(viscosity before storage)×100

[Evaluation Criteria]

D: The rate of viscosity change was higher than or equal to 20%.

C: The rate of viscosity change was higher than or equal to 10% but lower than 20%.

B: The rate of viscosity change was higher than or equal to 5% but lower than 10%.

A: The rate of viscosity change was lower than 5%.

Example 1

A three-dimensional object 1 was produced in the manner described below with the produced powder material 1 for forming a three-dimensional object and the liquid material 1 for forming a three-dimensional object, and a shape printing pattern having a size of 70 mm in length and 12 mm in width. The liquid material 1 for forming a three-dimensional object was used after left to stand still in a thermostat bath of 50° C. for thirty days and then left to stand still until room temperature.

(1) With a three-dimensional object producing apparatus as illustrated in FIG. 1, the powder material 1 for forming a three-dimensional object was moved from the supplying-side powder storing tank to the forming-side powder storing tank to supply the powder material 1 for forming a three-dimensional object onto the supporting member to have an average thickness of 100 µm.

(2) Next, the liquid material 1 for forming a three-dimensional object was delivered (discharged) onto the surface of the supplied powder material 1 for forming a three-dimensional object from nozzles of a known inkjet discharging head. The polyvinyl alcohol was dissolved in the water contained in the liquid material 1 for forming a three-dimensional object, and the acetoacetyl group-modified polyvinyl alcohol was cross-linked by the action of the cross-linking agent (zirconium carbonate ammonium salt) contained in the liquid material 1 for forming a three-dimensional object.

(3) Next, the operations of (1) and (2) were repeated until a predetermined total average thickness of 3 mm, and hardened thin layers of the powder material 1 for forming a three-dimensional object were laminated sequentially. Then, the laminated thin layers were subjected to a drying step in which the laminated thin layers were dried with a dryer at 65° C. for 4 hours and then maintained at 140° C. for 10 hours, to obtain a three-dimensional object 1.

The three-dimensional object 1 after dried was blown with air to remove any excess powder material 1 for forming a three-dimensional object. As a result, the three-dimensional object 1 did not undergo a shape collapse, and exhibited excellent strength and dimensional precision.

Incidentally, strength (hardness) and dimensional precision were evaluated according to the criteria described below. The results are presented in Table 1.

<Strength (Hardness)>

D: The powder material for forming a three-dimensional object was not hardened sufficiently, such that the three-dimensional object could not be taken out from the laminated layers of the powder material for forming a three-dimensional object, and if taken out, would not be able to retain the predetermined shape.

C: The three-dimensional object could be taken out from the laminated layers of the powder material for forming a three-dimensional object. Unnecessary part of the powder material for forming a three-dimensional object could be removed by adjusting an air blow pressure or by using a brush, and the three-dimensional object could retain the shape.

B: The three-dimensional object was blown with air strongly. As a result, only unnecessary part of the powder material for forming a three-dimensional object was removed, and the three-dimensional object retained the shape.

A: The three-dimensional object was hardened sufficiently and would not be broken easily.

<Dimensional Precision>

D: The surface of the three-dimensional object was distorted. Observation of the surface revealed uneven distribution of the base material and the organic material.

C: The surface of the three-dimensional object was slightly distorted and had slight irregularities.

B: The surface condition of the three-dimensional object was favorable, but the surface had a slight warpage.

A: The surface of the three-dimensional object was smooth and beautiful, and had no warpage.

(4) The three-dimensional object 1 obtained in (3) was subjected to a dewaxing step by being heated with a dryer under a nitrogen atmosphere up to 400° C., and then sintered in a sintering furnace under vacuum conditions at 1,300° C. As a result, the three-dimensional object 1 (sintered body) having a beautiful surface was obtained.

This three-dimensional object 1 was a completely monolithic stainless structure (metal block), and did not undergo a breakage or the like at all when slammed onto a hard floor.

Example 2

A three-dimensional object 2 was produced in the same manner as in Example 1 except that the liquid material 1 for forming a three-dimensional object used in Example 1 was changed to a liquid material 2 for forming a three-dimensional object prepared in the manner described below. The three-dimensional object 2 was evaluated in the same manners as in Example 1. The results are presented in Table 1.

—Preparation of Liquid Material 2 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a dihydroxy ethyl glycine salt as a stabilizing agent (CHELEST G-50 available from Chelest Corporation) (0.3 parts by mass), and polyvinyl pyrrolidone K-90 as a water-soluble resin (available from BASF GmbH, with a weight average molecular weight of 1,400,000) (0.5 parts by mass) were subjected to a dispersion treatment using a homomixer for 30 minutes, to prepare a liquid material 2 for forming a three-dimensional object. Storage stability of the produced liquid material 2 for forming a three-dimensional object was evaluated in the same manner as in Example 1. The result is presented in Table 1.

Example 3

A three-dimensional object 3 was produced in the same manner as in Example 1 except that the liquid material 1 for forming a three-dimensional object used in Example 1 was changed to a liquid material 3 for forming a three-dimensional object prepared in the manner described below. The three-dimensional object 3 was evaluated in the same manners as in Example 1. The results are presented in Table 1.

—Preparation of Liquid Material 3 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a dihydroxy ethyl glycine salt as a stabilizing agent (CHELEST G-50 available from Chelest Corporation) (0.3 parts by mass), and polyvinyl pyrrolidone K-90 as a water-soluble resin (available from BASF GmbH, with a weight average molecular weight of 1,400,000) (1 part by mass) were subjected to a dispersion treatment using a homomixer for 30 minutes, to prepare a liquid material 3 for forming a three-dimensional object. Storage stability of the produced liquid material 3 for forming a three-dimensional object was evaluated in the same manner as in Example 1. The result is presented in Table 1.

Example 4

A three-dimensional object 4 was produced in the same manner as in Example 1 except that the liquid material 1 for forming a three-dimensional object used in Example 1 was changed to a liquid material 4 for forming a three-dimensional object prepared in the manner described below. The three-dimensional object 4 was evaluated in the same manners as in Example 1. The results are presented in Table 2.

—Preparation of Liquid Material 4 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-85 as a water-soluble resin (available from Nippon Shokubai Co., Ltd., with a weight average molecular weight of 1,000,000) (0.5 parts by mass) were subjected to a dispersion treatment using a homomixer for 30 minutes, to prepare a liquid material 4 for forming a three-dimensional object. Storage stability of the produced liquid material 4 for forming a three-dimensional object was evaluated in the same manner as in Example 1. The result is presented in Table 2.

Example 5

A three-dimensional object 5 was produced in the same manner as in Example 1 except that the liquid material 1 for forming a three-dimensional object used in Example 1 was changed to a liquid material 5 for forming a three-dimensional object prepared in the manner described below. The three-dimensional object 5 was evaluated in the same manners as in Example 1. The results are presented in Table 2.

—Preparation of Liquid Material 5 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a phosphono butane tricarboxylic acid salt as a stabilizing agent (CHELEST PH-435 available from Chelest Corporation) (0.3 parts by mass), and a 35% by mass aqueous solution of polyvinyl pyrrolidone K-60 as a water-soluble resin (available from Tokyo Chemical Industry Co., Ltd., with a weight average molecular weight of 450,000) (3 parts by mass) were subjected to a dispersion treatment using a homomixer for 30 minutes, to prepare a liquid material 5 for forming a three-dimensional object. Storage stability of the produced liquid material 5 for forming a three-dimensional object was evaluated in the same manner as in Example 1. The result is presented in Table 2.

Example 6

A three-dimensional object 6 was produced in the same manner as in Example 1 except that the liquid material 1 for forming a three-dimensional object used in Example 1 was changed to a liquid material 6 for forming a three-dimensional object prepared in the manner described below. The three-dimensional object 6 was evaluated in the same manners as in Example 1. The results are presented in Table 2.

—Preparation of Liquid Material 6 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-30 as a water-soluble resin (available from DKS Co. Ltd., with a weight average molecular weight of 50,000) (0.1 parts by mass) were subjected to a dispersion treatment using a homomixer for 30 minutes, to prepare a liquid material 6 for forming a three-dimensional object. Storage stability of the produced liquid material 6 for forming a three-dimensional object was evaluated in the same manner as in Example 1. The result is presented in Table 2.

Example 7

A three-dimensional object 7 was produced in the same manner as in Example 1 except that the liquid material 1 for forming a three-dimensional object used in Example 1 was changed to a liquid material 7 for forming a three-dimensional object prepared in the manner described below. The three-dimensional object 7 was evaluated in the same manners as in Example 1. The results are presented in Table 3.

—Preparation of Liquid Material 7 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a dihydroxy ethyl glycine salt as a stabilizing agent (CHELEST G-50 available from Chelest Corporation) (0.3 parts by mass), and polyvinyl pyrrolidone K-30 as a water-soluble resin (available from DKS Co. Ltd., with a weight average molecular weight of 50,000) (0.5 parts by mass) were subjected to a dispersion treatment using a homomixer for 30 minutes, to prepare a liquid material 7 for forming a three-dimensional object. Storage stability of the produced liquid material 7 for forming a three-dimensional object was evaluated in the same manner as in Example 1. The result is presented in Table 3.

Example 8

A three-dimensional object 8 was produced in the same manner as in Example 1 except that the liquid material 1 for forming a three-dimensional object used in Example 1 was changed to a liquid material 8 for forming a three-dimensional object prepared in the manner described below. The three-dimensional object 8 was evaluated in the same manners as in Example 1. The results are presented in Table 3.
—Preparation of Liquid Material 8 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a phosphono butane tricarboxylic acid salt as a stabilizing agent (CHELEST PH-435 available from Chelest Corporation) (0.3 parts by mass), and polyvinyl pyrrolidone K-30 as a water-soluble resin (available from DKS Co. Ltd., with a weight average molecular weight of 50,000) (1 part by mass) were subjected to a dispersion treatment using a homomixer for 30 minutes, to prepare a liquid material 8 for forming a three-dimensional object. Storage stability of the produced liquid material 8 for forming a three-dimensional object was evaluated in the same manner as in Example 1. The result is presented in Table 3.

Example 9

A three-dimensional object 9 was produced in the same manner as in Example 1 except that the liquid material 1 for forming a three-dimensional object used in Example 1 was changed to a liquid material 9 for forming a three-dimensional object prepared in the manner described below. The three-dimensional object 9 was evaluated in the same manners as in Example 1. The results are presented in Table 3.
—Preparation of Liquid Material 9 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a phosphono butane tricarboxylic acid salt as a stabilizing agent (CHELEST PH-435 available from Chelest Corporation) (0.3 parts by mass), and polyvinyl pyrrolidone K-30 as a water-soluble resin (available from DKS Co. Ltd., with a weight average molecular weight of 50,000) (3 parts by mass) were subjected to a dispersion treatment using a homomixer for 30 minutes, to prepare a liquid material 9 for forming a three-dimensional object. Storage stability of the produced liquid material 9 for forming a three-dimensional object was evaluated in the same manner as in Example 1. The result is presented in Table 3.

Example 10

A three-dimensional object 10 was produced in the same manner as in Example 1 except that the liquid material 1 for forming a three-dimensional object used in Example 1 was changed to a liquid material 10 for forming a three-dimensional object prepared in the manner described below. The three-dimensional object 10 was evaluated in the same manners as in Example 1. The results are presented in Table 4.
—Preparation of Liquid Material 10 for Forming Three-Dimensional Object—

Water as a solvent (70 parts by mass), 3-methyl-1,3-butanediol as a water-soluble organic solvent (available from Tokyo Chemical Industry Co., Ltd., with a vapor pressure of 15.05 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-90 as a water-soluble resin (available from BASF GmbH, with a weight average molecular weight of 1,400,000) (0.1 parts by mass) were subjected to a dispersion treatment using a homomixer for 30 minutes, to prepare a liquid material 10 for forming a three-dimensional object. Storage stability of the produced liquid material 10 for forming a three-dimensional object was evaluated in the same manner as in Example 1. The result is presented in Table 4.

Example 11

A three-dimensional object 11 was produced in the same manner as in Example 1 except that the liquid material 1 for forming a three-dimensional object used in Example 1 was changed to a liquid material 11 for forming a three-dimensional object prepared in the manner described below. The three-dimensional object 11 was evaluated in the same manners as in Example 1. The results are presented in Table 4.
—Preparation of Liquid Material 11 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium lactate ammonium salt as a cross-linking agent (ORGATIX ZC-300 available from Matsumoto Fine Chemical Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-90 as a water-soluble resin (available from BASF GmbH, with a weight average molecular weight of 1,400,000) (1 part by mass) were subjected to a dispersion treatment using a homomixer for 30 minutes, to prepare a liquid material 11 for forming a three-dimensional object.

Storage stability of the produced liquid material 11 for forming a three-dimensional object was evaluated in the same manner as in Example 1. The result is presented in Table 4.

Example 12

A three-dimensional object 12 was produced in the same manner as in Example 1 except that the liquid material 1 for forming a three-dimensional object used in Example 1 was changed to a liquid material 12 for forming a three-dimensional object prepared in the manner described below. The three-dimensional object 12 was evaluated in the same manners as in Example 1. The results are presented in Table 4.

—Preparation of Liquid Material 12 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium lactate ammonium salt as a cross-linking agent (ORGATIX ZC-300 available from Matsumoto Fine Chemical Co., Ltd.) (3 parts by mass), a dihydroxy ethyl glycine salt as a stabilizing agent (CHELEST G-50 available from Chelest Corporation) (0.3 parts by mass), and polyvinyl pyrrolidone K-85 as a water-soluble resin (available from Nippon Shokubai Co., Ltd., with a weight average molecular weight of 1,000,000) (1 part by mass) were subjected to a dispersion treatment using a homomixer for 30 minutes, to prepare a liquid material 12 for forming a three-dimensional object.

Storage stability of the produced liquid material 12 for forming a three-dimensional object was evaluated in the same manner as in Example 1. The result is presented in Table 4.

Example 13

A three-dimensional object 13 was produced in the same manner as in Example 1 except that the liquid material 1 for forming a three-dimensional object used in Example 1 was changed to a liquid material 13 for forming a three-dimensional object prepared in the manner described below. The three-dimensional object 13 was evaluated in the same manners as in Example 1. The results are presented in Table 5.

—Preparation of Liquid Material 13 for Forming Three-Dimensional Object—

Water as a solvent (70 parts by mass), 3-methyl-1,3-butanediol as a water-soluble organic solvent (available from Tokyo Chemical Industry Co., Ltd., with a vapor pressure of 15.05 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a dihydroxy ethyl glycine salt as a stabilizing agent (CHELEST G-50 available from Chelest Corporation) (0.3 parts by mass), and a 35% by mass aqueous solution of polyvinyl pyrrolidone K-60 as a water-soluble resin (available from Tokyo Chemical Industry Co., Ltd., with a weight average molecular weight of 450,000) (5 parts by mass) were subjected to a dispersion treatment using a homomixer for 30 minutes, to prepare a liquid material 13 for forming a three-dimensional object.

Storage stability of the produced liquid material 13 for forming a three-dimensional object was evaluated in the same manner as in Example 1. The result is presented in Table 5.

Example 14

A three-dimensional object 14 was produced in the same manner as in Example 1 except that the liquid material 1 for forming a three-dimensional object used in Example 1 was changed to a liquid material 14 for forming a three-dimensional object prepared in the manner described below. The three-dimensional object 14 was evaluated in the same manners as in Example 1. The results are presented in Table 5.

—Preparation of Liquid Material 14 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyethylene glycol as a water-soluble resin ("PEG 500,000" available from Wako Pure Chemical Industries, Ltd., primary, with a weight average molecular weight Mw of 500,000) (0.1 parts by mass) were subjected to a dispersion treatment using a homomixer for 30 minutes, to prepare a liquid material 14 for forming a three-dimensional object.

Storage stability of the produced liquid material 14 for forming a three-dimensional object was evaluated in the same manner as in Example 1. The result is presented in Table 5.

Example 15

A three-dimensional object 15 was produced in the same manner as in Example 1 except that the liquid material 1 for forming a three-dimensional object used in Example 1 was changed to a liquid material 15 for forming a three-dimensional object prepared in the manner described below. The three-dimensional object 15 was evaluated in the same manners as in Example 1. The results are presented in Table 5.

—Preparation of Liquid Material 15 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyethylene glycol as a water-soluble resin ("PEG 500,000" available from Wako Pure Chemical Industries, Ltd., primary, with a weight average molecular weight Mw of 500,000) (0.5 parts by mass) were subjected to a dispersion treatment using a homomixer for 30 minutes, to prepare a liquid material 15 for forming a three-dimensional object.

Storage stability of the produced liquid material 15 for forming a three-dimensional object was evaluated in the same manner as in Example 1. The result is presented in Table 5.

Comparative Example 1

A three-dimensional object 16 was produced in the same manner as in Example 1 except that the liquid material 1 for forming a three-dimensional object used in Example 1 was changed to a liquid material 16 for forming a three-dimensional object prepared in the manner described below. The three-dimensional object 16 was evaluated in the same manners as in Example 1. The results are presented in Table 6.

—Preparation of Liquid Material 16 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium lactate ammonium salt as a cross-linking agent (ORGATIX ZC-300 available from Matsumoto Fine Chemical Co., Ltd.) (3 parts by mass), 2-amino-2-ethyl-1,3-propanediol as a stabilizing agent (AEPD available from Tokyo Chemical Industry Co., Ltd.) (0.3 parts by mass), and polyvinyl pyrrolidone K-15 as a water-soluble resin (available from Tokyo Chemical Industry Co., Ltd., with a weight average molecular weight of 10,000) (15 parts by mass) were subjected to a dispersion treatment using a homomixer for 30 minutes, to prepare a liquid material 16 for forming a three-dimensional object. Storage stability of the produced liquid material 16 for forming a three-dimensional object was evaluated in the same manner as in Example 1. The result is presented in Table 6.

Comparative Example 2

A three-dimensional object 17 was produced in the same manner as in Example 1 except that the liquid material 1 for forming a three-dimensional object used in Example 1 was changed to a liquid material 17 for forming a three-dimensional object prepared in the manner described below. The three-dimensional object 17 was evaluated in the same manners as in Example 1. The results are presented in Table 6.

—Preparation of Liquid Material 17 for Forming Three-Dimensional Object—

Water as a solvent (70 parts by mass), propylene glycol as a water-soluble organic solvent (available from Tokyo Chemical Industry Co., Ltd., with a vapor pressure of 20.19 mmHg at 100° C.) (30 parts by mass), a zirconium carbonate ammonium salt as a cross-linking agent (ZIRCOZOL AC-20 available from Daiichi Kigenso Kagaku Kogyo Co., Ltd.) (3 parts by mass), a dihydroxy ethyl glycine salt as a stabilizing agent (CHELEST G-50 available from Chelest Corporation) (0.3 parts by mass), and polyvinyl pyrrolidone K-15 as a water-soluble resin (available from Tokyo Chemical Industry Co., Ltd., with a weight average molecular weight of 10,000) (15 parts by mass) were subjected to a dispersion treatment using a homomixer for 30 minutes, to prepare a liquid material 17 for forming a three-dimensional object. Storage stability of the produced liquid material 17 for forming a three-dimensional object was evaluated in the same manner as in Example 1. The result is presented in Table 6.

TABLE 1

|  | Ex. 1 | | Ex. 2 | | Ex. 3 | |
| --- | --- | --- | --- | --- | --- | --- |
| Powder material No. | Powder material 1 for forming three-dimensional object | | | | | |
| Liquid material No. | Liquid material 1 for forming three-dimensional object | | Liquid material 2 for forming three-dimensional object | | Liquid material 3 for forming three-dimensional object | |
| Cross-linking agent | Zirconium carbonate ammonium salt | 3 parts by mass | Zirconium carbonate ammonium salt | 3 parts by mass | Zirconium carbonate ammonium salt | 3 parts by mass |
| Water-soluble resin | PVP K-90 (Mw = 1,400,000) | 0.1 parts by mass | PVP K-90 (Mw = 1,400,000) | 0.5 parts by mass | PVP K-90 (Mw = 1,400,000) | 1 part by mass |
| Stabilizing agent | AEPD | 0.3 parts by mass | G-50 | 0.3 parts by mass | G-50 | 0.3 parts by mass |
| Water-soluble organic solvent | Propylene glycol | 30 parts by mass | Propylene glycol | 30 parts by mass | Propylene glycol | 30 parts by mass |
| Solvent | Water | 70 parts by mass | Water | 70 parts by mass | Water | 70 parts by mass |
| Storage stability | A | | A | | B | |
| Three-dimensional object No. | Three-dimensional object 1 | | Three-dimensional object 2 | | Three-dimensional object 3 | |
| Strength of three-dimensional object | A | | A | | A | |
| Dimensional precision of three-dimensional object | A | | A | | A | |

TABLE 2

|  | Ex. 4 | Ex. 5 | Ex. 6 |
| --- | --- | --- | --- |
| Powder material No. | Powder material 1 for forming three-dimensional object | | |
| Liquid material No. | Liquid material 4 for forming three-dimensional object | Liquid material 5 for forming three-dimensional object | Liquid material 6 for forming three-dimensional object |

TABLE 2-continued

|  | Ex. 4 | | Ex. 5 | | Ex. 6 | |
| --- | --- | --- | --- | --- | --- | --- |
| Cross-linking agent | Zirconium carbonate ammonium salt | 3 parts by mass | Zirconium carbonate ammonium salt | 3 parts by mass | Zirconium carbonate ammonium salt | 3 parts by mass |
| Water-soluble resin | PVP K-85 (Mw = 1,000,000) | 0.5 parts by mass | 35% aqueous solution of PVP K-60 (Mw = 450,000) | 3 parts by mass | PVP K-30 (Mw = 50,000) | 0.1 parts by mass |
| Stabilizing agent | AEPD | 0.3 parts by mass | PH-435 | 0.3 parts by mass | AEPD | 0.3 parts by mass |
| Water-soluble organic solvent | Propylene glycol | 30 parts by mass | Propylene glycol | 30 parts by mass | Propylene glycol | 30 parts by mass |
| Solvent | Water | 70 parts by mass | Water | 70 parts by mass | Water | 70 parts by mass |
| Storage stability | A | | B | | A | |
| Three-dimensional object No. | Three-dimensional object 4 | | Three-dimensional object 5 | | Three-dimensional object 6 | |
| Strength of three-dimensional object | A | | B | | B | |
| Dimensional precision of three-dimensional object | A | | B | | B | |

TABLE 3

|  | Ex. 7 | | Ex. 8 | | Ex. 9 | |
| --- | --- | --- | --- | --- | --- | --- |
| Powder material No. | Powder material 1 for forming three-dimensional object | | | | | |
| Liquid material No. | Liquid material 7 for forming three-dimensional object | | Liquid material 8 for forming three-dimensional object | | Liquid material 9 for forming three-dimensional object | |
| Cross-linking agent | Zirconium carbonate ammonium salt | 3 parts by mass | Zirconium carbonate ammonium salt | 3 parts by mass | Zirconium carbonate ammonium salt | 3 parts by mass |
| Water-soluble resin | PVP K-30 (Mw = 50,000) | 0.5 parts by mass | PVP K-30 (Mw = 50,000) | 1 part by mass | PVP K-30 (Mw = 50,000) | 3 parts by mass |
| Stabilizing agent | G-50 | 0.3 parts by mass | PH-435 | 0.3 parts by mass | PH-435 | 0.3 parts by mass |
| Water-soluble organic solvent | Propylene glycol | 30 parts by mass | Propylene glycol | 30 parts by mass | Propylene glycol | 30 parts by mass |
| Solvent | Water | 70 parts by mass | Water | 70 parts by mass | Water | 70 parts by mass |
| Storage stability | A | | B | | C | |
| Three-dimensional object No. | Three-dimensional object 7 | | Three-dimensional object 8 | | Three-dimensional object 9 | |
| Strength of three-dimensional object | B | | B | | C | |
| Dimensional precision of three-dimensional object | B | | B | | C | |

TABLE 4

|  | Ex. 10 | Ex. 11 | Ex. 12 |
| --- | --- | --- | --- |
| Powder material No. | Powder material 1 for forming three-dimensional object | | |
| Liquid material No. | Liquid material 10 for forming three-dimensional object | Liquid material 11 for forming three-dimensional object | Liquid material 12 for forming three-dimensional object |

TABLE 4-continued

| | Ex. 10 | | Ex. 11 | | Ex. 12 | |
|---|---|---|---|---|---|---|
| Cross-linking agent | Zirconium carbonate ammonium salt | 3 parts by mass | Zirconium lactate ammonium salt | 3 parts by mass | Zirconium lactate ammonium salt | 3 parts by mass |
| Water-soluble resin | PVP K-90 (Mw = 1,400,000) | 0.1 parts by mass | PVP K-90 (Mw = 1,400,000) | 1 part by mass | PVP K-85 (Mw = 1,000,000) | 1 part by mass |
| Stabilizing agent | AEPD | 0.3 parts by mass | AEPD | 0.3 parts by mass | G-50 | 0.3 parts by mass |
| Water-soluble organic solvent | 3-methyl-1,3-butanediol | 30 parts by mass | Propylene glycol | 30 parts by mass | Propylene glycol | 30 parts by mass |
| Solvent | Water | 70 parts by mass | Water | 70 parts by mass | Water | 70 parts by mass |
| Storage stability | B | | A | | A | |
| Three-dimensional object No. | Three-dimensional object 10 | | Three-dimensional object 11 | | Three-dimensional object 12 | |
| Strength of three-dimensional object | A | | B | | B | |
| Dimensional precision of three-dimensional object | A | | B | | B | |

TABLE 5

| | Ex. 13 | | Ex. 14 | | Ex. 15 | |
|---|---|---|---|---|---|---|
| Powder material No. | Powder material 1 for forming three-dimensional object | | | | | |
| Liquid material No. | Liquid material 13 for forming three-dimensional object | | Liquid material 14 for forming three-dimensional object | | Liquid material 15 for forming three-dimensional object | |
| Cross-linking agent | Zirconium carbonate ammonium salt | 3 parts by mass | Zirconium carbonate ammonium salt | 3 parts by mass | Zirconium carbonate ammonium salt | 3 parts by mass |
| Water-soluble resin | 35% aqueous solution of PVP K-60 (Mw = 450,000) | 5 parts by mass | PEG 50,000 | 0.1 parts by mass | PEG 50,000 | 0.5 parts by mass |
| Stabilizing agent | G-50 | 0.3 parts by mass | AEPD | 0.3 parts by mass | AEPD | 0.3 parts by mass |
| Water-soluble organic solvent | 3-methyl-1,3-butanediol | 30 parts by mass | Propylene glycol | 30 parts by mass | Propylene glycol | 30 parts by mass |
| Solvent | Water | 70 parts by mass | Water | 70 parts by mass | Water | 70 parts by mass |
| Storage stability | B | | A | | A | |
| Three-dimensional object No. | Three-dimensional object 13 | | Three-dimensional object 14 | | Three-dimensional object 15 | |
| Strength of three-dimensional object | B | | C | | C | |
| Dimensional precision of three-dimensional object | B | | C | | C | |

TABLE 6

|  | Comp. Ex. 1 | | Comp. Ex. 2 | |
| --- | --- | --- | --- | --- |
| Powder material No. | Powder material 1 for forming three-dimensional object | | | |
| Liquid material No. | Liquid material 16 for forming three-dimensional object | | Liquid material 17 for forming object | |
| Cross-linking agent | Zirconium lactate ammonium salt | 3 parts by mass | Zirconium carbonate ammonium salt | 3 parts by mass |
| Water-soluble resin | PVP K-15 (Mw = 10,000) | 15 parts by mass | PVP K-15 (Mw = 10,000) | 15 parts by mass |
| Stabilizing agent | AEPD | 0.3 parts by mass | G-50 | 0.3 parts by mass |
| Water-soluble organic solvent | Propylene glycol | 30 parts by mass | Propylene glycol | 30 parts by mass |
| Solvent | Water | 70 parts mass by | Water | 70 part by mass |
| Storage stability | — | | — | |
| Three-dimensional object No. | Three-dimensional object 16 | | Three-dimensional object 17 | |
| Strength of three-dimensional object | — | | — | |
| Dimensional precision of three-dimensional object | — | | — | |

*The sign " " in Table 6 means "unmeasureable"
Details of the abbreviation in Table 1 to Table 6 are as follows:
*"AEPD": 2-amino-2-ethyl-1,3-propanediol (available from Tokyo Chemical Industry Co., Ltd.)
*"G-50": a dihydroxy ethyl glycine salt (Chelest G-50 available from Chelest Corporation)
*"PH-435": a phosphono butane tricarboxylic acid salt (CHELEST PH-435 available from Chelest Corporation)
*"PEG 500,000": polyethylene glycol (available from Wako Pure Chemical Industries, Ltd., primary, with a weigh average molecular weight Mw of 500,000).

Aspects of the present invention are, for example, as presented below.

<1> A liquid material for forming a three-dimensional object, the liquid material being used for forming a three-dimensional object made of a powder material for forming a three-dimensional object, the powder material including an organic material and a base material, the liquid material including:
a cross-linking agent cross-linkable with the organic material; and
a water-soluble resin having a weight average molecular weight of greater than or equal to 50,000.

<2> The liquid material for forming a three-dimensional object according to <1>,
wherein the water-soluble resin has a weight average molecular weight of greater than or equal to 700,000.

<3> The liquid material for forming a three-dimensional object according to <1> or <2>,
wherein the water-soluble resin is polyvinyl pyrrolidone.

<4> The liquid material for forming a three-dimensional object according to any one of <1> to <3>,
wherein the cross-linking agent is a metal salt.

<5> The liquid material for forming a three-dimensional object according to any one of <1> to <4>,
wherein the cross-linking agent is a zirconium compound.

<6> The liquid material for forming a three-dimensional object according to any one of <1> to <5>, further including at least one selected from the group consisting of an amino group-containing compound, a phosphono group-containing compound, a gluconic acid, and a salt of the gluconic acid.

<7> The liquid material for forming a three-dimensional object according to <6>,
wherein the amino group-containing compound is an amino group-containing polyvalent alcohol, a hydroxyl group-containing amine compound, or an amino group-containing chelate agent.

<8> The liquid material for forming a three-dimensional object according to any one of <1> to <7>, further including a solvent,
wherein the solvent contains a water-soluble organic solvent having a vapor pressure of higher than or equal to 10 mmHg at 100° C.

<9> The liquid material for forming a three-dimensional object according to any one of <1> to <8>,
wherein the liquid material is capable of dissolving the organic material.

<10> A material set for forming a three-dimensional object, the material set including:
a powder material for forming a three-dimensional object, the powder material including an organic material and a base material; and
the liquid material for forming a three-dimensional object according to any one of <1> to <9>.

<11> The material set for forming a three-dimensional object according to <10>,
wherein the base material is coated with the organic material.

<12> The material set for forming a three-dimensional object according to <10> or <11>,
wherein the base material is a base material non-reactive with the liquid material for forming a three-dimensional object.

<13> The material set for forming a three-dimensional object according to any one of <10> to <12>,
wherein the base material is at least one of a metal and a ceramic.

<14> The material set for forming a three-dimensional object according to any one of <10> to <13>,
wherein the organic material includes a water-soluble resin.

<15> The material set for forming a three-dimensional object according to <14>,
wherein the water-soluble resin includes a modified polyvinyl alcohol resin.

<16> A three-dimensional object producing method including:
a powder material layer forming step of forming a layer of a powder material for forming a three-dimensional object, the powder material including an organic material and a base material; and
a liquid material delivering step of delivering a liquid material for forming a three-dimensional object to a predetermined region of the layer of the powder material formed in the powder material layer forming step,
wherein the three-dimensional object producing method repeats the powder material layer forming step and the liquid material delivering step to produce a three-dimensional object, and
wherein the liquid material for forming a three-dimensional object is the liquid material for forming a three-dimensional object according to any one of <1> to <9>.

<17> The three-dimensional object producing method according to <16>, further including
a sintering step of sintering the three-dimensional object produced through repetition of the powder material layer forming step and the liquid material delivering step.
<18> A three-dimensional object producing apparatus including:
a powder material layer forming unit configured to form a layer of a powder material for forming a three-dimensional object, the powder material including an organic material and a base material;
a liquid material delivering unit configured to deliver the liquid material for forming a three-dimensional object according to any one of <1> to <9> to a predetermined region of the layer of the powder material formed by the powder material layer forming unit;
a powder material container in which the powder material for forming a three-dimensional object is stored; and
a liquid material container in which the liquid material for forming a three-dimensional object is stored.

What is claimed is:

1. A liquid consisting of:
a solvent;
a cross-linking agent which comprises a metal salt;
a water-soluble resin having a weight average molecular weight of greater than or equal to 50,000;
optionally, a stabilizing agent which is at least one selected from the group consisting of a compound that comprises an amino group, a compound that comprises a phosphono group, a gluconic acid, and a salt of the gluconic acid; and
optionally, at least one selected from the group consisting of a surfactant, a defoamer, a pH adjustor, an antiseptic/fungicide, a chelate agent, and an anti-rust agent,
wherein the liquid is used for forming a three-dimensional object made of a powder that comprises an organic material and a base material,
wherein the liquid is capable of dissolving the organic material, and
wherein the cross-linking agent is cross-linkable with the organic material.

2. The liquid according to claim 1,
wherein the water-soluble resin has a weight average molecular weight of greater than or equal to 700,000.

3. The liquid according to claim 1,
wherein the water-soluble resin comprises polyvinyl pyrrolidone.

4. The liquid according to claim 1,
wherein the cross-linking agent comprises a zirconium compound.

5. The liquid according to claim 1, further comprising the stabilizing agent.

6. The liquid according to claim 5,
wherein the compound that comprises an amino group comprises a polyvalent alcohol that comprises an amino group, an amine compound that comprises a hydroxyl group, or a chelate agent that comprises an amino group.

7. The liquid according to claim 1,
wherein the solvent comprises a water-soluble organic solvent having a vapor pressure of higher than or equal to 10 mmHg at 100° C.

8. A material set for forming a three-dimensional object, comprising:
a powder for forming a three-dimensional object, where the powder comprises an organic material and a base material; and
a liquid for forming a three-dimensional object, where the liquid consists of:
a solvent;
a cross-linking agent cross-linkable with the organic material, the cross-linkable agent comprising a metal salt;
a water-soluble resin having a weight average molecular weight of greater than or equal to 50,000;
optionally, a stabilizing agent which is at least one selected from the group consisting of a compound that comprises an amino group, a compound that comprises a phosphono group, a gluconic acid, and a salt of the gluconic acid; and
optionally, at least one selected from the group consisting of a surfactant, a defoamer, a pH adjustor, an antiseptic/fungicide, a chelate agent, and an anti-rust agent,
wherein the liquid is capable of dissolving the organic material.

9. The material set for forming a three-dimensional object according to claim 8,
wherein the base material is coated with the organic material.

10. The material set for forming a three-dimensional object according to claim 8,
wherein the base material is a base material non-reactive with the liquid.

11. The material set for forming a three-dimensional object according to claim 8,
wherein the base material comprises at least one of a metal and a ceramic.

12. The material set for forming a three-dimensional object according to claim 8,
wherein the organic material comprises a water-soluble resin.

13. The material set for forming a three-dimensional object according to claim 12,
wherein the water-soluble resin comprises a modified polyvinyl alcohol resin.

14. A three-dimensional object producing method comprising:
forming a layer of a powder for forming a three-dimensional object, where the powder comprises an organic material and a base material; and
delivering a liquid for forming a three-dimensional object to a predetermined region of the layer of the powder,
wherein the three-dimensional object producing method repeats the forming and the delivering to produce a three-dimensional object,
wherein the liquid consists of:
a solvent;
a cross-linking agent cross-linkable with the organic material, the cross-linkable agent comprising a metal salt;
a water-soluble resin having a weight average molecular weight of greater than or equal to 50,000;
optionally, a stabilizing agent which is at least one selected from the group consisting of a compound that comprises an amino group, a compound that comprises a phosphono group, a gluconic acid, and a salt of the gluconic acid; and
optionally, at least one selected from the group consisting of a surfactant, a defoamer, a pH adjustor, an antiseptic/fungicide, a chelate agent, and an anti-rust agent, and
wherein the liquid is capable of dissolving the organic material.

15. The three-dimensional object producing method according to claim 14, further comprising sintering the three-dimensional object produced through repetition of the forming and the delivering.

* * * * *